(12) United States Patent
Watanabe et al.

(10) Patent No.: US 7,889,432 B2
(45) Date of Patent: Feb. 15, 2011

(54) IMMERSION MICROSCOPE OBJECTIVE LENS

(75) Inventors: Katsuya Watanabe, Yokohama (JP); Takayuki Morita, Fujisawa (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 12/633,823

(22) Filed: Dec. 9, 2009

(65) Prior Publication Data

US 2010/0182702 A1    Jul. 22, 2010

(30) Foreign Application Priority Data

Dec. 11, 2008  (JP) .............................. 2008-315458
Apr. 8, 2009   (JP) .............................. 2009-094059

(51) Int. Cl.
G02B 21/02    (2006.01)

(52) U.S. Cl. ................. 359/656; 359/657; 359/658; 359/659; 359/660; 359/661; 359/713; 359/714; 359/715; 359/716; 359/791

(58) Field of Classification Search ......... 359/656–661, 359/713–716, 791
See application file for complete search history.

(56) References Cited

U.S. PATENT DOCUMENTS 5,517,360 A *  5/1996  Suzuki ....................... 359/658
5,532,878 A *  7/1996  Suenaga et al. ............. 359/657
5,982,559 A * 11/1999  Furutake ..................... 359/656
6,519,092 B2 *  2/2003  Yamaguchi ................. 359/656
7,046,451 B2 *  5/2006  Mandai et al. .............. 359/661
7,158,310 B2    1/2007  Sakakura et al.
7,262,922 B2 *  8/2007  Yamaguchi ................. 359/656
7,382,542 B2    6/2008  Wartmann
2003/0043473 A1 *  3/2003  Okuyama .................... 359/659
2006/0203354 A1 *  9/2006  Fujimoto et al. ............ 359/660

FOREIGN PATENT DOCUMENTS

JP    2006-65030 A    3/2006

* cited by examiner

*Primary Examiner*—Evelyn A. Lester
(74) *Attorney, Agent, or Firm*—Miles & Stockbridge P.C.

(57) ABSTRACT

An immersion microscope objective lens of the present invention has: in order from an object, a first lens group G1 having positive refractive power and having a cemented lens of a plano convex lens having a plane facing the object and a meniscus lens having a concave surface facing the object, and a single meniscus lens having a convex surface facing the object; a second lens group having positive refractive power and having a plurality of cemented lenses; and a third lens group having negative refractive power and having a cemented meniscus lens having a concave surface facing an image, and a cemented meniscus lens having a concave surface facing the object. And the following conditional expressions $0.12<d0/f<0.25$, $0.04<\theta Ct(p)-\theta Ct(n)<0.09$ and $-0.03<\theta hg(p)-\theta hg(n)<0.00$ are satisfied.

12 Claims, 13 Drawing Sheets

EXAMPLE 1

EXAMPLE 1

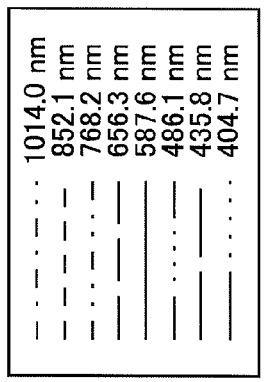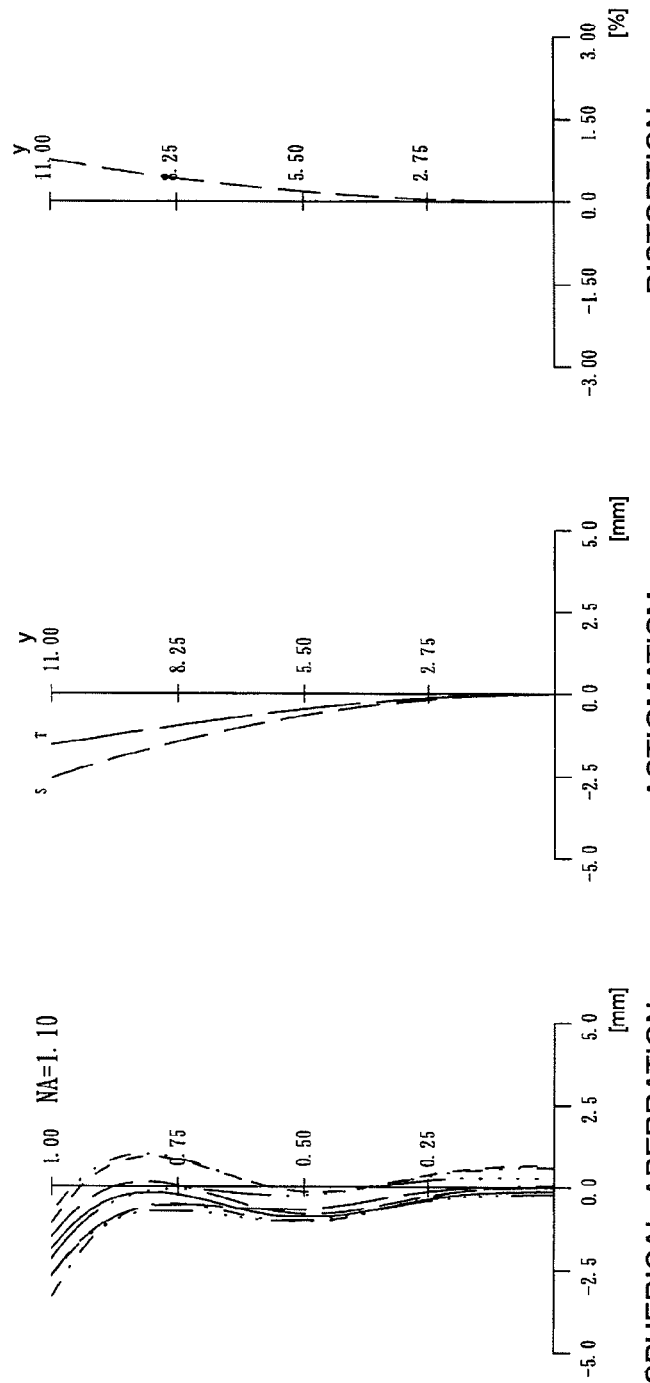

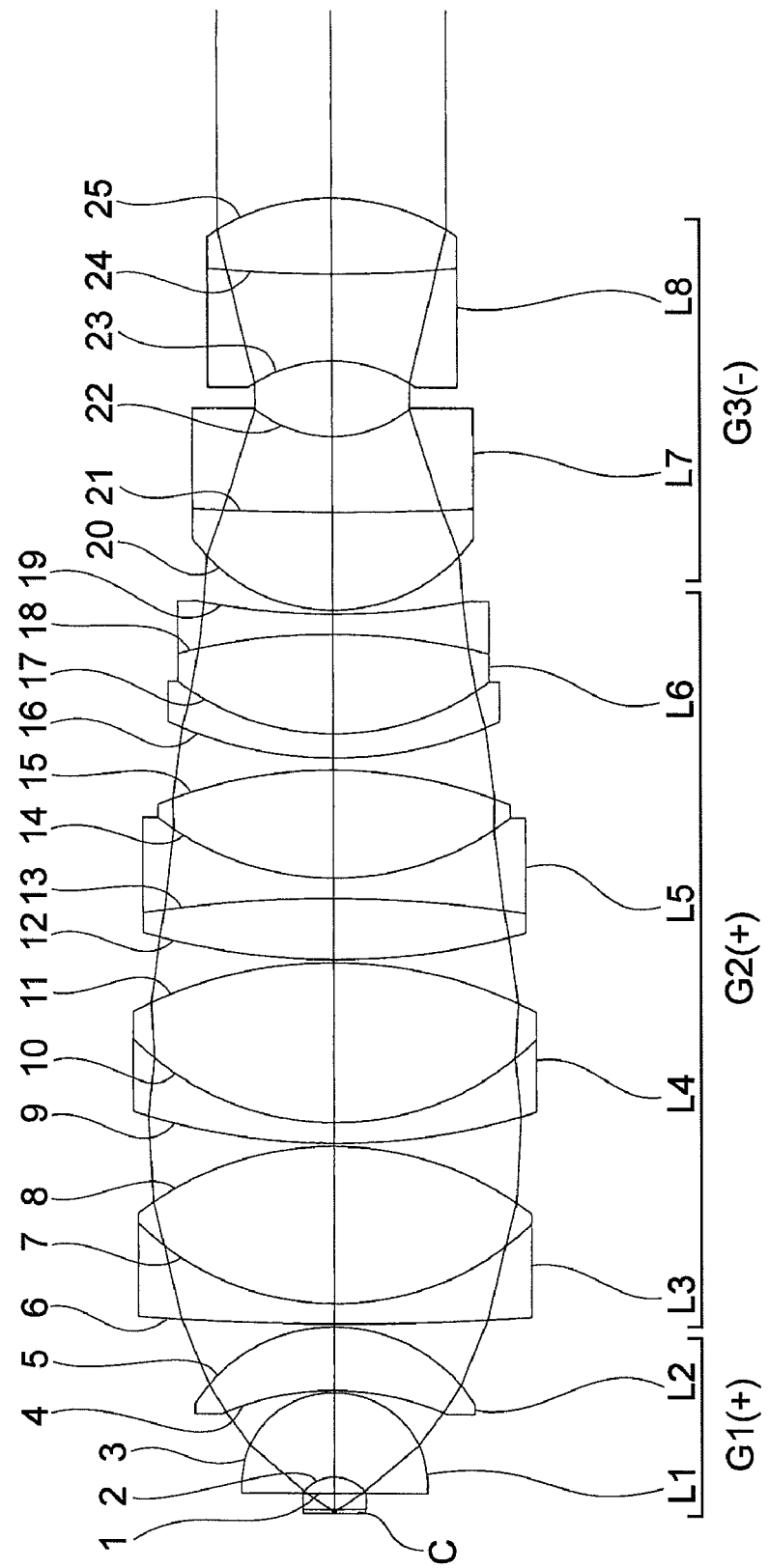

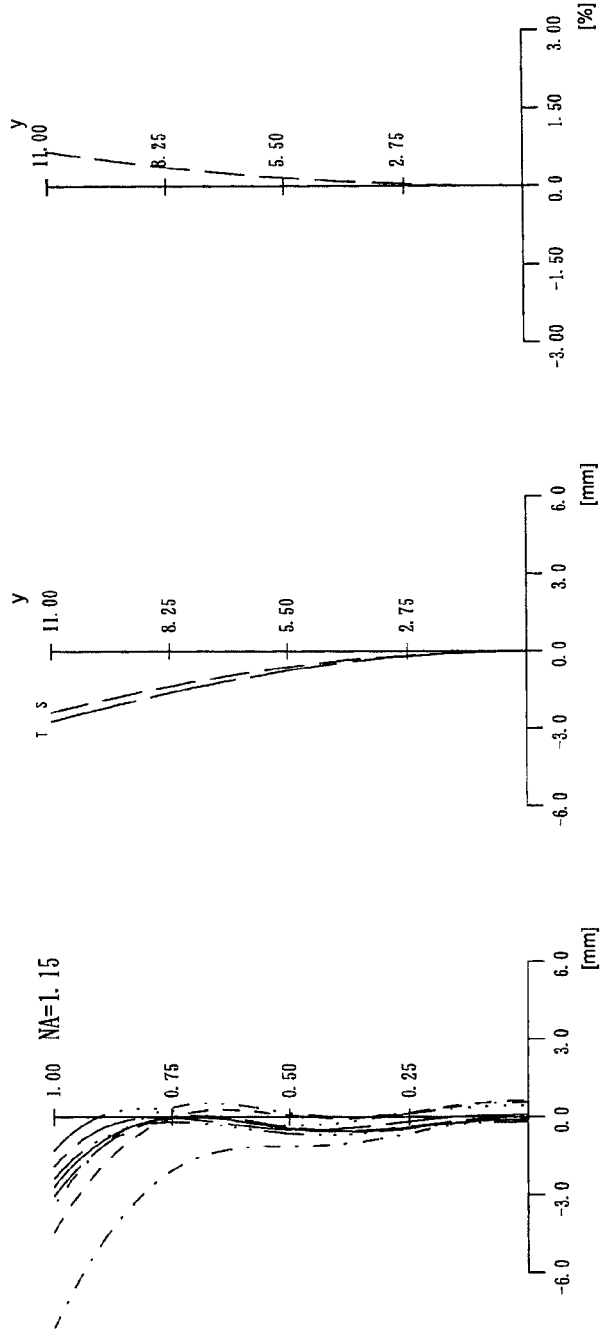

EXAMPLE 3

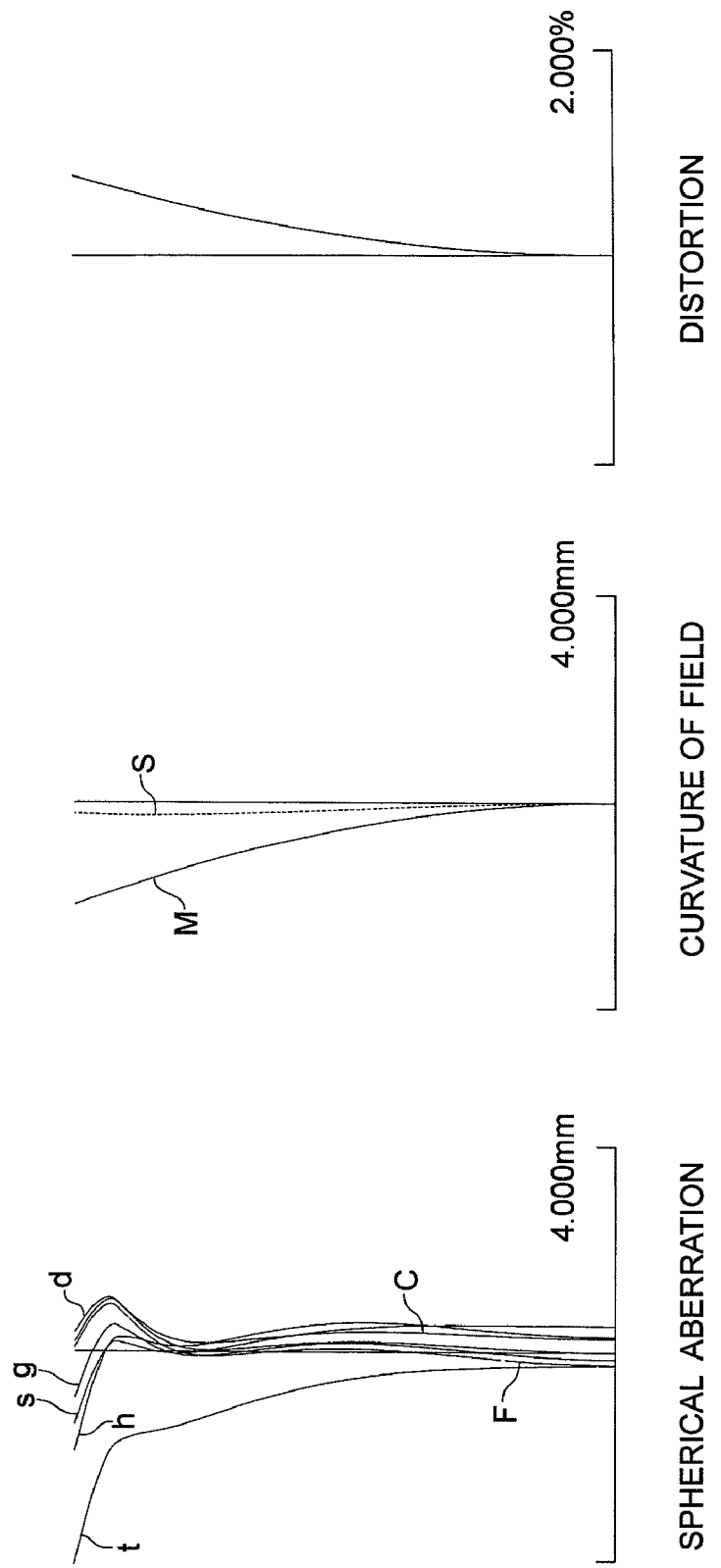

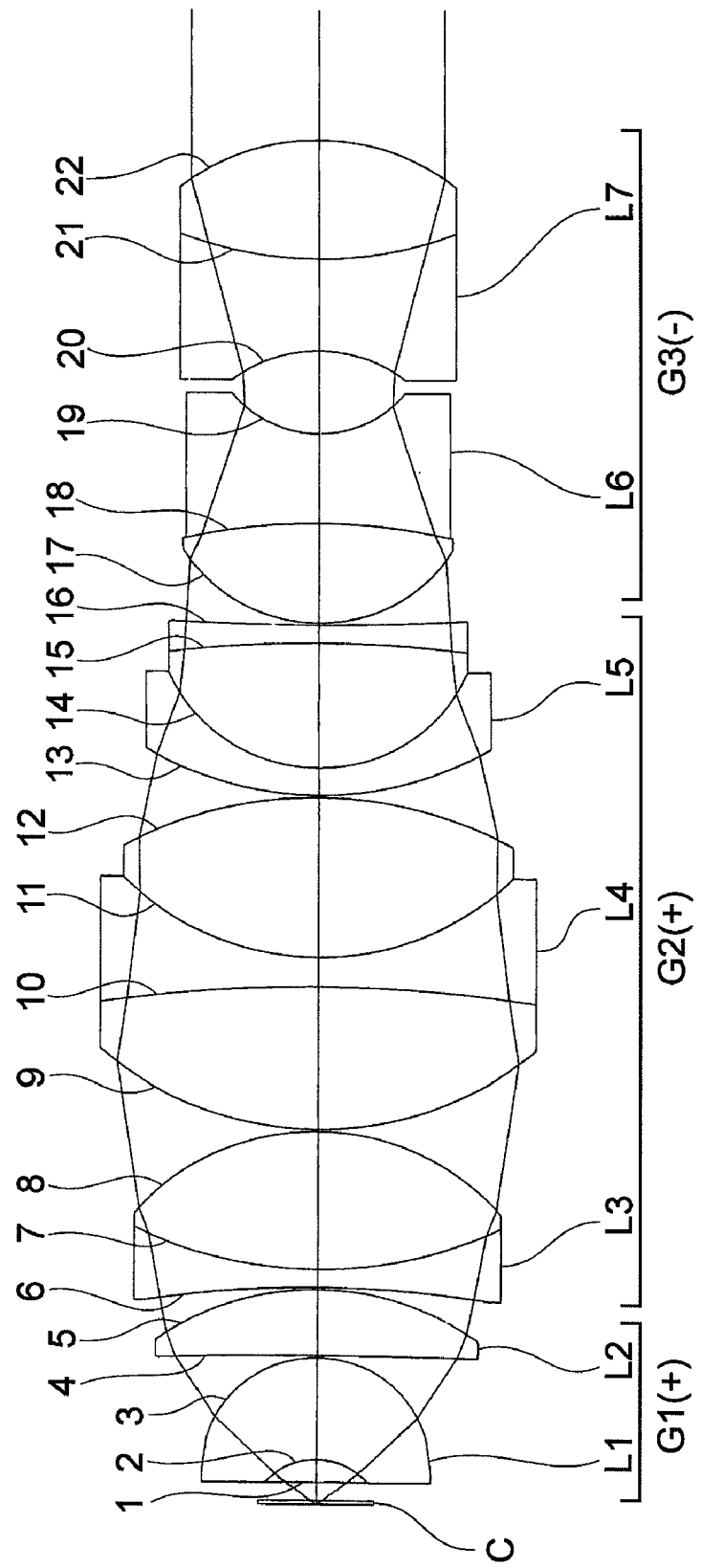

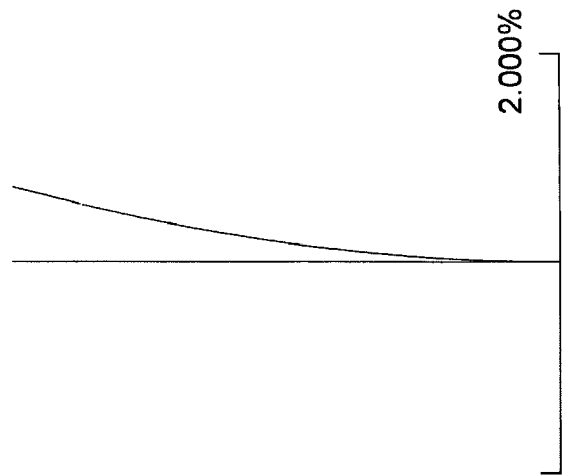
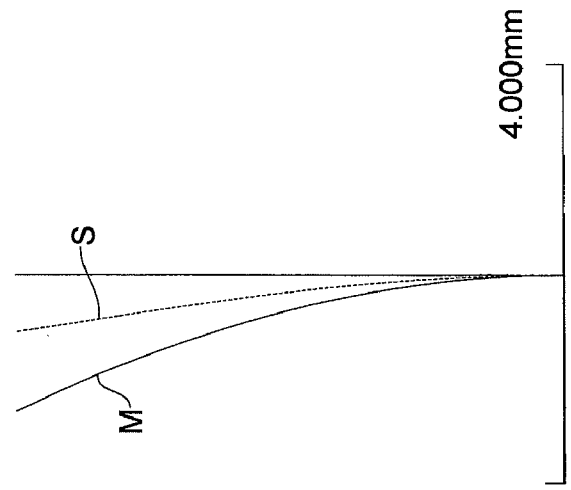
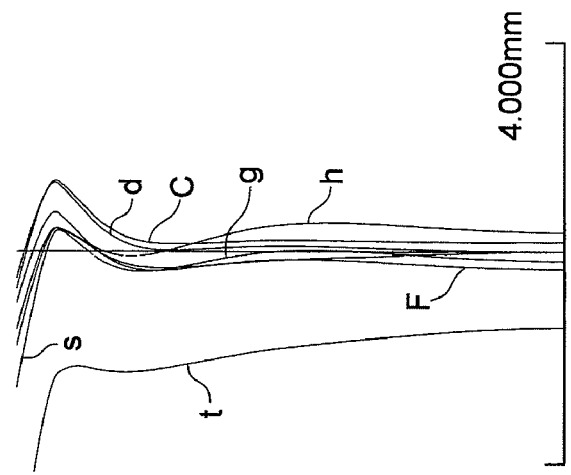

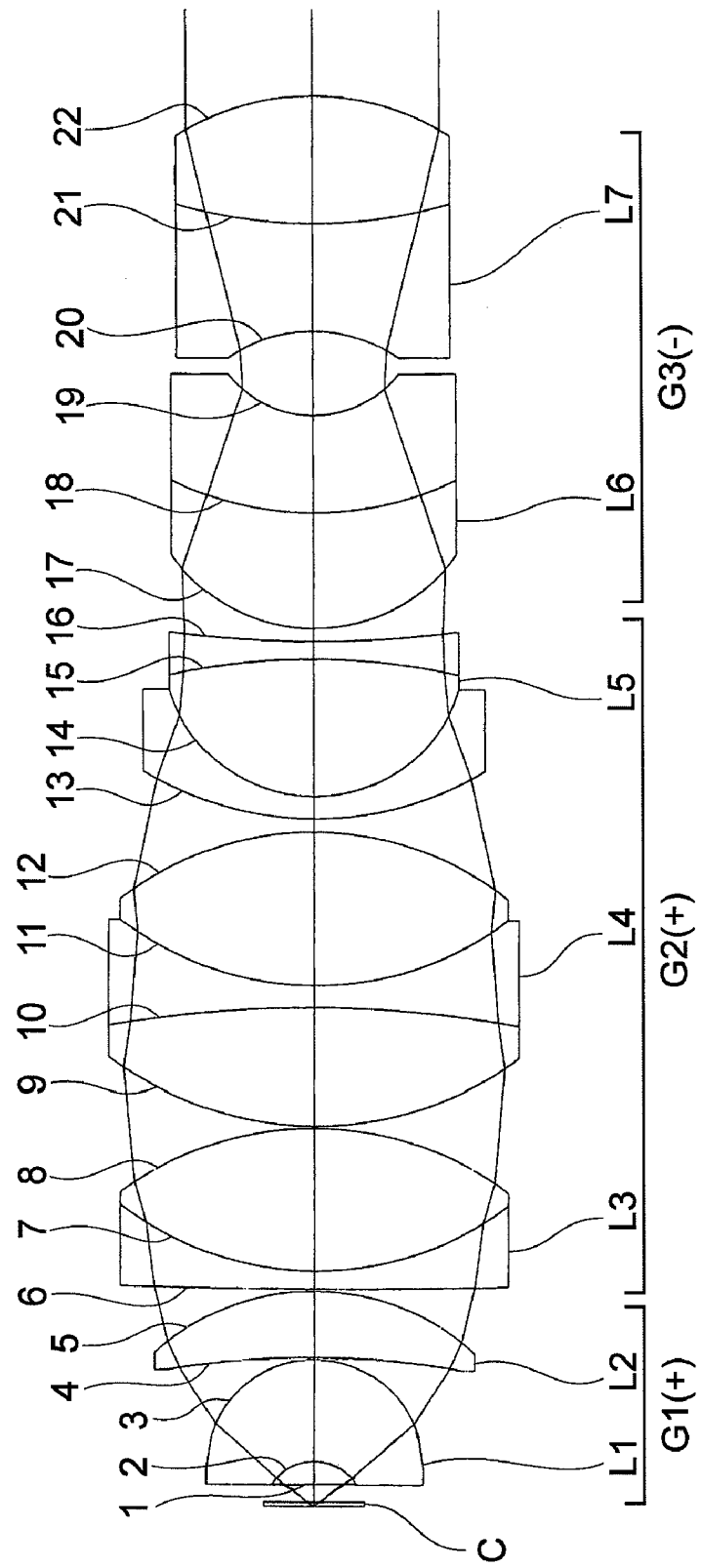

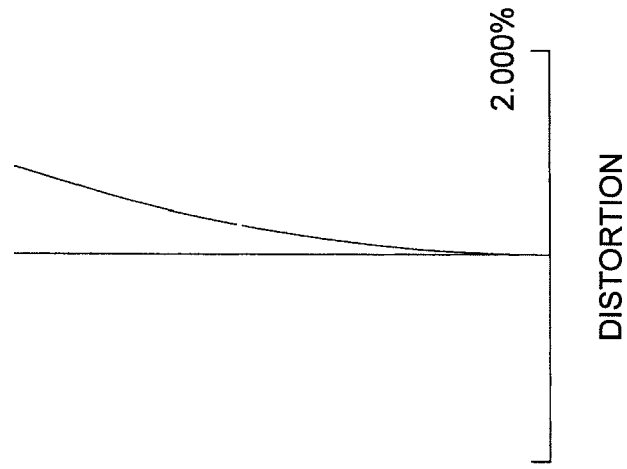
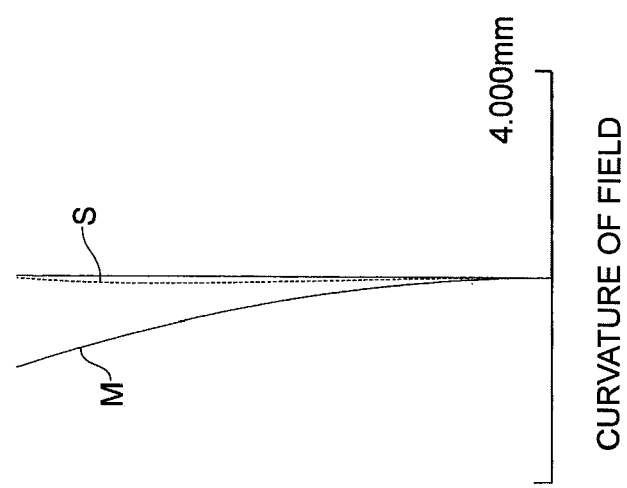
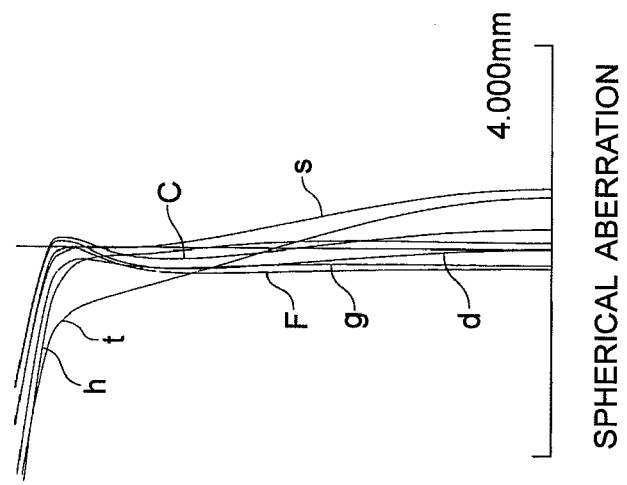

IMMERSION MICROSCOPE OBJECTIVE LENS

INCORPORATION BY REFERENCE

This invention claims the benefit of Japanese Patent Application Nos. 2008-315458 and 2009-094059 which are hereby incorporated by reference.

FIELD OF THE INVENTION

The present invention relates to an immersion microscope objective lens.

BACKGROUND OF THE INVENTION

Recently observation methods using near infrared light are increasing in research fields using biological microscopes. This is because of the advantage that a deep area that cannot be seen with visible light can be observed, since scattering in biological tissue is less, and photo-toxicity is low. For such observation methods, various applications, including 2-photon, CARS and SHG, are known. Even in conventional fluorescent observation methods, those using fluorescence dye, to cause excitation using longer wavelengths, are increasing in terms of photo-toxicity. On the other hand, observation methods using shorter wavelengths for photo excitation are still in high demand because of its high fluorescent efficiency (e.g. laser with about a 405 nm wavelength used for excitation light source for photo activation).

Considering such a situation, the performance demand for microscope objective lenses is that various aberrations are corrected throughout a wider wavelength area, and in particular that out of focus rarely occurs at each wavelength, and a sufficiently small spot diameter is obtained at each wavelength. An extension of the working distance is also desired in order to improve operability.

Thus far, an objective lens, in which chromatic aberration is corrected well throughout a very wide wavelength area of the g-line to t-line, has been disclosed (e.g. see Japanese Patent Application Laid-Open No. 2006-65030).

SUMMARY OF THE INVENTION

In the case of conventional objective lens, however, the working distance is insufficient to observe a thick sample using the above mentioned application, particularly with 2-photon excitation.

SUMMARY OF THE INVENTION

With the foregoing in view, it is an object of the present invention to provide an immersion microscope objective lens which has a long working distance and in which various aberrations are corrected well throughout a wide wavelength area (approximately h-line to t-line).

MEANS TO SOLVE THE PROBLEMS

To achieve this object, an immersion microscope objective lens of the present invention comprises: in order from an object, a first lens group with positive refractive power, having a cemented lens of a plano convex lens having a plane facing the object and a meniscus lens having a concave surface facing the object, and a single meniscus lens having a convex surface facing the object; a second lens group with positive refractive power, having a plurality of cemented lenses; and a third lens group with negative refractive power, having a cemented meniscus lens having a concave surface facing an image, and a cemented meniscus lens having a concave surface facing the object, and the following conditional expression is satisfied:

$$0.12 < d0/f < 0.25$$

where d0 denotes a distance from the object surface to the first lens surface, and f denotes the focal length of the objective lens, and a positive lens and a negative lens which constitute at least one set of cemented lens in the second lens groups satisfy the following conditional expressions:

$$0.04 < \theta Ct(p) - \theta Ct(n) < 0.09$$

$$-0.03 < \theta hg(p) - \theta hg(n) < 0.00$$

where $\theta Ct(p)$ denotes a partial dispersion ratio of the F-line, C-line and t-line and $\theta hg(p)$ denotes a partial dispersion ratio of the h-line, g-line F-line and C-line of the positive lens, and $\theta Ct(n)$ denotes a partial dispersion ratio of the F-line, C-line, t-line and $\theta hg(n)$ denotes a partial dispersion ratio of the h-line, g-line, F-line and C-line of the negative lens (where the partial dispersion ratio $\theta Ct$ and $\theta hg$ are defined by $\theta Ct=(nC-nt)/(nF-nC)$ and $\theta hg=(nh-ng)/(nF-nC)$, when nC denotes a refractive index of the glass material at the C-line, nt denotes a refractive index thereof at the t-line, nF denotes a refractive index thereof at the F-line, nh denotes a refractive index thereof at the h-line, and ng denotes a refractive index thereof at the g-line.)

It is preferable that the cemented lens of the plano convex which constitutes the first lens group and the meniscus lens having the concave surface facing the object satisfies the following conditional expressions:

$$0.3 < |r2/f| < 0.7$$

$$1.0 < |r3/d2| < 1.3$$

where r2 denotes a radius of curvature of the cemented surface of the cemented lens, f denotes a focal length of the objective lens, r3 denotes a radius of curvature of the image side lens surface of the meniscus lens having the concave surface facing the object, and d2 denotes a thickness of the meniscus lens having a concave surface facing the object.

It is preferable that the negative lens which constitutes the cemented lens disposed closest to the object, out of the second lens group, satisfies the following conditional expression:

$$40 < v3n < 60$$

where v3n denotes an Abbe number.

It is preferable that the second lens group includes at least a cemented lens that uses fluorite as glass material of the positive lens component, and a cemented lens that uses anomalous dispersion glass with an 80 or higher Abbe number as glass material of the positive lens component.

It is preferable that the anomalous dispersion glass with an 80 or higher Abbe number is a fluoride or phospate compound anomalous dispersion glass.

An immersion microscope objective lens of the present invention comprises: in order from an object, a plano convex embedded lens having a strong concave cemented surface facing the object; and two cemented meniscus lenses of which respective concave surfaces face each other, and the cemented meniscus lens having the concave surface facing the object in the two cemented meniscus lenses, comprises, in order from the object, a negative lens and a positive lens, and satisfies the following conditional expressions:

$$0.0029 < \{\theta CtA'(Ln) - \theta CtA'(Lp)\}/\{vd(Ln) - vd(Lp)\} \leq 0.0052$$

$$0.00034 < \{\theta Fgh(Ln) - \theta Fgh(Lp)\}/\{vd(Ln) - vd(Lp)\} \leq 0.00046$$

$$38 < vd(Lp) < 50$$

where θCtA'(Ln) and θCtA'(Lp) denote partial dispersion ratios of the C-line, t-line and A'-line of the negative lens and the positive lens respectively, θFgh(Ln) and θFgh(Lp) denote partial dispersion ratios of the F-line, g-line and h-line of the negative lens and positive lens respectively, and νd(Ln) and νd(Lp) denote Abbe numbers at the d-line of the negative lens and the positive lens respectively (where the partial dispersion ratios θCtA' and θFgh are defined as θCtA'=(nC−nt)/(nC−nA') and θFgh=(nF−ng)/(nF−nh) respectively, where nC denotes a refractive index of the glass material at the C-line, nt denotes a refractive index thereof at the t-line, nA' denotes a refractive index thereof at the A'-line, nF denotes a refractive index thereof at the F-line, ng denotes a refractive index thereof at the g-line, and nh denotes a refractive index thereof at the h-line.)

It is preferable that the plano concave embedded lens is a cemented lens of a plano convex lens having a plane facing the object and a meniscus lens having a concave surface facing the object, which are disposed in order from the object and cemented at the cemented surface, and satisfies the following conditional expression:

$$1.0 < |r2|/(d0+d1) < 1.7$$

where r2 denotes a curvature of the cemented surface of the plano convex embedded lens, d0 denotes a length from the object surface to the lens surface of the plano convex lens facing the object, and d1 denotes a center thickness of the plano convex lens.

ADVANTAGEOUS EFFECTS OF THE INVENTION

As described above, according to the present invention, an immersion microscope objective lens which has a long working distance, in which various aberrations are corrected well throughout a wide wavelength area (approximately h-line to t-line), can be implemented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2 are graphs showing various aberrations of the microscope objective lens according to Example 1 of the present invention, where FIG. 2A shows spherical aberration, FIG. 2B shows astigmatism, and FIG. 2C shows distortion;

FIG. 3 is a diagram depicting a lens configuration of a microscope objective lens according to Example 2 of the present invention;

FIG. 4 are graphs showing various aberrations of the microscope objective lens according to Example 2 of the present invention, where FIG. 4A shows spherical aberration, FIG. 4B shows astigmatism, and FIG. 4C shows distortion;

FIG. 6 are graphs showing various aberrations of the microscope objective lens according to Example 3 of the present invention, where FIG. 6A shows spherical aberration, FIG. 6B shows curvature of field, and FIG. 6C shows distortion;

FIG. 7 is a diagram depicting a lens configuration of a microscope objective lens according to Example 4 of the present invention;

FIG. 8 are graphs showing various aberrations of the microscope objective lens according to Example 4 of the present invention, where FIG. 8A shows spherical aberration, FIG. 8B shows curvature of field, and FIG. 8C shows distortion;

FIG. 9 is a diagram depicting a lens configuration of a microscope objective lens according to Example 5 of the present invention;

FIG. 10 are graphs showing various aberrations of the microscope objective lens according to Example 5 of the present invention, where FIG. 10A shows spherical aberration, FIG. 10B shows curvature of field, and FIG. 10C shows distortion;

FIG. 12A shows spherical aberration, FIG. 12B shows curvature of field, and FIG. 12C shows distortion.

DESCRIPTION OF THE PREFERRED EMBODIMENTS

Figure 1:
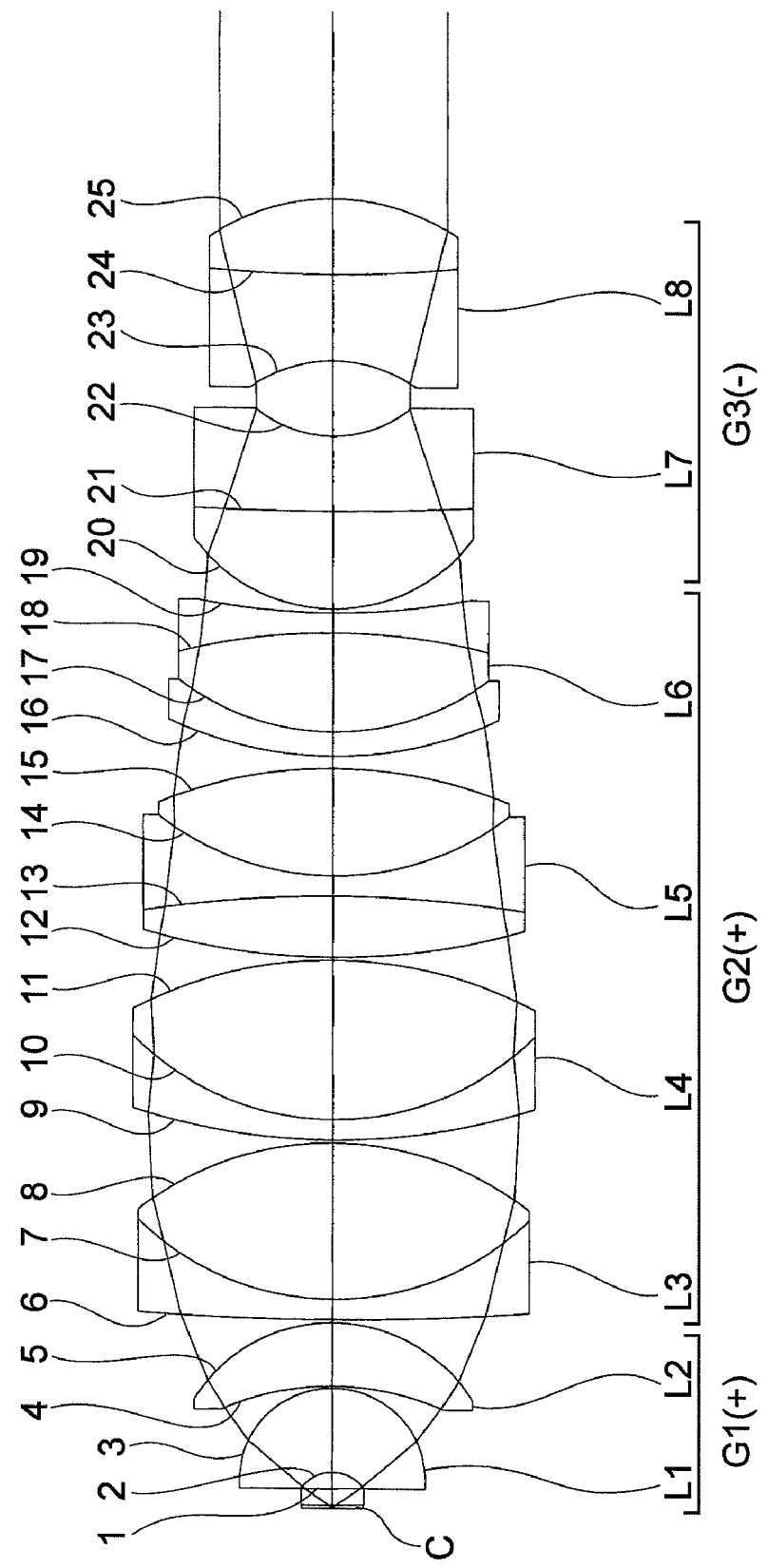
FIG. 1 is a diagram depicting a lens configuration of a microscope objective lens according to Example 1 of the present invention.

Preferred embodiments will now be described with reference to the drawings. An object of the present invention, is as mentioned above, to secure a long working distance and to implement chromatic aberration correction in a wide wavelength area, in an immersion microscope objective lens. However a long working distance and chromatic aberration correction in a wide wavelength area are in a trade-off relationship.

Increasing the working distance not only deteriorates chromatic aberration, but also has a major effect on deterioration of curvature of field. Therefore according to the object lens of the present embodiment, a cemented lens of a plano convex lens and a meniscus lens having a concave surface facing the object (plano convex embedded lens) is disposed in a first lens group, and concave surfaces having a relatively small radius of curvature face each other in a third lens group, so that a rise in the Petzval sum is suppressed, and deterioration of curvature of field is minimized.

In order to correct chromatic aberration in a wide wavelength area, it is essential to select a glass material, to minimize the difference of the partial dispersion ratio in each correction target wavelength area. However, if the chromatic aberration correction range is quite wide, from the h-line to near infrared, such as the t-line for example, as in the case of the objective lens of the present embodiment, the number of partial dispersions to be considered becomes enormous, and it is difficult to easily solve the problem merely by a combination of negative and positive components of one cemented lens. For example, if glass materials are combined considering only decreasing the secondary spectrum in the shorter wavelength side from the visible light area, chromatic aberration of wavelengths longer than the wavelengths of a visible light area cannot be corrected sufficiently.

Therefore according to the present embodiment, a plurality of cemented lenses are disposed in the second lens group, and glass materials of these cemented lenses are selected so that these cemented lenses have a different combination of partial dispersion ratios of a positive lens and a negative lens respectively. Specifically, glass materials of the cemented lenses of the second lens group are selected using a combination with which the secondary spectrum becomes small in the shorter wavelength side than the visible light area, and a combination with which the secondary spectrum becomes large in the longer wavelength side than the visible light area, whereby chromatic aberration can be decreased in all the correction target wavelength areas in a well balanced manner.

For the positive lens component of the cemented lenses constituting the second lens group, it is preferable to use both one of which glass material of the positive lens component is fluorite, and one of which glass material of the positive lens component is anomalous dispersion glass with an 80 or higher Abbe number. The anomalous dispersion glass with an 80 or higher Abbe number is preferably fluoride or a phosphate compound anomalous dispersion glass. These fluoride or phosphate compound anomalous dispersion glasses that have been developed have characteristics that are close to fluorite in the visible light area, but have different dispersion characteristics from fluorite in the near infrared area. Therefore by mixing these glasses and fluorite, chromatic aberration can be corrected in a wide wavelength area.

The microscope objective lens of the present embodiment based on this configuration satisfies the following conditional Expression (1), where d0 denotes a length from the object surface to the first lens surface, and f denotes a focal length of the objective lens, and a positive lens and a negative lens constituting at least one set of cemented lens of the second lens group satisfies the following conditional Expressions (2) and (3), where $\theta Ct(p)$ denotes a partial dispersion ratio of the F-line, C-line and t-line, $\theta hg(p)$ denotes a partial dispersion ratio of the h-line, g-line, F-line and C-line of the positive lens, and $\theta Ct(n)$ denotes a partial dispersion ratio of the F-line, C-line and t-line of the negative lens, and $\theta hg(n)$ denotes a partial dispersion ratios of the h-line, g-line, F-line and C-line of the negative lens (the partial dispersion ratio $\theta Ct$ and $\theta hg$ are defined by $\theta Ct=(nC-nt)/(nF-nC)$ and $\theta hg=(nh-ng)/(nF-nC)$, where nc denotes a refractive index of the glass material at the C-line, nt denotes a refractive index thereof at the t-line, nF denotes a refractive index thereof at the F-line, nh denotes a refractive index thereof at the h-line, and ng denotes a refractive index thereof at the g-line).

$$0.12 < d0/f < 0.25 \quad (1)$$

$$0.04 < \theta Ct(p) - \theta Ct(n) < 0.09 \quad (2)$$

$$-0.03 < \theta hg(p) - \theta hg(n) < 0.00 \quad (3)$$

The conditional Expression (1) is for defining an appropriate range of working distance. If the lower limit value of the conditional Expression (1) is not reached, the working distance becomes short, and focusing on the deep portion of a thick sample is difficult. And if the upper limit value of the conditional Expression (1) is exceeded, the height of the ray that passes through the first lens surface (lens surface closest to the object in the objective lens) increases, and the radius of curvature of the cemented surface of the cemented lens constituting the first lens group must be increased, which deteriorates the flatness of the image surface.

The conditional Expression (2) is for correcting chromatic aberration as well in the near infrared area. If there is an attempt to correct chromatic aberration in both the near infrared area and an area in the shorter wavelength side, including the h-line, at the same time, correction of color aberration in the near infrared area tends to be insufficient. To correct this state, it is desirable to increase the difference of the partial dispersion ratios in the visible light area and infrared area, which is the opposite of the norm. If the lower limit value of the conditional Expression (2) is not reached, correction of chromatic aberration in the visible light area tends to be insufficient. And if the upper limit value of the conditional Expression (2) is exceeded, on the other hand, correction of chromatic aberration in the shorter wavelength side than the near infrared area, including the visible light area, becomes excessive, and this correction becomes difficult.

The conditional Expression (3) is for correcting chromatic aberration of the h-line well. To correct the h-line, the difference of the partial dispersion ratios $\theta hg(p) - \theta hg(n)$ is decreased. But decreasing this value is in a trade-off relationship with satisfying the above mentioned conditional Expression (2), so conditional Expression (3) shows an appropriate range to satisfy both of the conditions. If the lower limit value of the conditional Expression (3) is not reached, the residual chromatic aberration of the h-line increases. If the upper limit value of the conditional Expression (3) is exceeded, on the other hand, only a combination of glass materials, of which difference of Abbe numbers is small, can be used, and primary chromatic aberration cannot be corrected.

According to the present embodiment, it is preferable that the cemented lens of a plano convex lens constituting the first lens group and a meniscus lens having a concave surface facing the object (plano convex embedded lens) satisfies the following conditional Expressions (4) and (5), where r2 denotes a radius of curvature of the cemented surface of the cemented lens, f denotes a focal length of the objective lens, r3 denotes a radius of curvature of the image side lens surface of the meniscus lens having a concave surface facing the object, and d2 denotes a thickness of the meniscus lens having a concave surface facing the object.

$$0.3 < |r2/f| < 0.7 \quad (4)$$

$$1.0 < |r3/d2| < 1.3 \quad (5)$$

The conditional Expression (4) is for correcting curvature of field well. If the lower limit value of the conditional Expression (4) is not reached, an effective diameter of the first lens surface, which is disposed closest to the object, cannot be large enough to secure a long working distance. If the upper limit value of the conditional Expression (4) is exceeded, on the other hand, the radius of curvature of the cemented surface of the cemented lens constituting the first lens group increases, and negative refractive power becomes insufficient. Then the Petzval sum of the objective lens increases, which deteriorates the flatness of the image surface.

The conditional Expression (5) is for correcting spherical aberration and coma aberration well. If the lower limit value of the conditional Expression (5) is not reached, the coma aberration increases, and correction thereof becomes difficult. If the upper limit value of the conditional Expression (5) is exceeded, on the other hand, luminous flux spread too much, and correction of high order spherical aberration becomes particularly difficult.

In the present embodiment, it is preferable that the negative lens constituting the cemented lens disposed closest to the object, out of the second lens group, satisfies the following conditional Expression (6), where ν3n denotes an Abbe number.

$$40 < \nu 3n < 60 \quad (6)$$

The conditional Expression (6) is for correcting spherical aberration of colors throughout a wide wavelength area. If the lower limit value of the conditional Expression (6) is not reached, transmittance in the near ultraviolet area drops. If the upper limit value of the conditional Expression (6) is exceeded, on the other hand, the difference of Abbe numbers between this negative lens and the positive lens constituting the cemented lens decreases, and spherical aberration of colors cannot be corrected.

According to the present embodiment, an immersion microscope objective lens comprises, in order from an object: a plano convex embedded lens having a strong concave cemented surface facing the object; and two cemented meniscus lenses of which respective concave surfaces face each other, and the cemented meniscus lens having the concave surface facing the object, out of the two cemented meniscus lenses, further comprises, in order from the object, a negative lens and a positive lens, and satisfies the following conditional Expressions (7) to (9), where θCtA'(Ln) and θCtA'(Lp) denote partial dispersion ratios of the C-line, t-line and A'-line (long wavelength area) of the negative lens and positive lens respectively, θFgh(Ln) and θFgh(Lp) denote partial dispersion ratios of the F-line, g-line and h-line (shortest wavelength area) of the negative lens and positive lens respectively, and νd(Ln) and νd(Lp) denote the Abbe numbers at the d-line of the negative lens and positive lens respectively. The partial dispersion ratios θCtA' and θFgh are defined as θCtA'=(nC−nt)/(nC−nA') and θFgh=(nF−ng)/(nF−nh) respectively, where nC denotes a refractive index of the glass material at the C-line, nt denotes a refractive index thereof at the t-line, nA' denotes a refractive index thereof at the A'-line, nF denotes a refractive index thereof at the F-line, ng denotes a refractive index thereof at the g-line, and nh denotes a refractive index thereof at the h-line.

$$0.0029 < \{\theta CtA'(Ln) - \theta CtA'(Lp)\}/\{\nu d(Ln) - \nu d(Lp)\} \leq 0.0052 \quad (7)$$

$$0.00034 < \{\theta Fgh(Ln) - \theta Fgh(Lp)\}/\{\nu d(Ln) - \nu d(Lp)\} \leq 0.00046 \quad (8)$$

$$38 < \nu d(Lp) < 50 \quad (9)$$

According to the present embodiment, two cemented meniscus lenses are disposed so that the respective concave surfaces face each other in the third lens group, and by these strong concave surfaces, flatness is maintained and spherical aberration, coma aberration and astigmatism can be corrected well. In these two cemented meniscus lenses, axial aberration and secondary chromatic aberration are also corrected throughout the visible ligh area to the near infrared area. The conditional Expressions (7) to (9) are for correcting axial aberration and secondary chromatic aberration throughout the visible light area to the near infrared area by selecting a glass material for the cemented meniscus lens having a concave surface facing the object, out of the two cemented meniscus lenses.

In more concrete terms, the conditional Expressions (7) and (8) are for correcting secondary chromatic aberration effectively in a wide wavelength range from the ultraviolet area to the near infrared area when selecting the glass material of cemented meniscus lens having the concave surface facing the object. Generally in secondary chromatic aberration, movement with respect to the glass material and the change of curvature is smaller in the long wavelength area, compared with the short wavelength area. When chromatic aberration is corrected in a wide wavelength range, if a large difference exists between the long wavelength area and the short wavelength area in terms of the change of aberration with respect to the glass material and change of curvature, it is difficult to simultaneously correct various aberrations including axial chromatic aberration. If the respective upper limit values of the conditional Expressions (7) and (8) are exceeded, correction in the short wavelength area becomes an "under" correction when correction is performed in the long wavelength area and visible light area, and correction thereof becomes difficult. If the respective values of conditional Expressions (7) and (8) do not reach the lower limit values, on the other hand, correction in the long wavelength area becomes an "over" correction when correction is performed in the short wavelength area and visible light area, and correction thereof becomes difficult.

The conditional Expression (9) is for securing transmittance in selecting the glass material of the positive lens constituting the cemented meniscus lens having the concave surface facing the object, and for suppressing the influence of color aberration correction on other aberrations. If the lower limit value of the conditional Expression (9) is not reached, internal transmittance in the ultraviolet area becomes extremely low, which is not appropriate for fluorescent observation by UV excitation. If the upper limit value of the conditional Expression (9) is exceeded, on the other hand, dispersion difference between the positive lens and negative lens that satisfies the above mentioned conditional Expression (7) and (8) becomes small, and curvature of the cemented surfaces becomes sharp, which makes it difficult to correct various aberrations, including spherical aberration.

In the present embodiment, it is preferable that the plano convex embedded lens of the first lens group, that is, a cemented lens of a plano convex lens having a plane facing the object and a meniscus lens having a concave surface facing the object, which are disposed in order from the object and cemented at the cemented surface, satisfies the following conditional Expression (10), where r2 denotes a curvature of the cemented surface of the plano convex embedded lens, d0 denotes a length from the object surface to the lens surface of the plano convex lens facing the object, and d1 denotes a center thickness of the plano convex lens.

$$1.0 < |r2|/(d0+d1) < 1.7 \quad (10)$$

The conditional Expression (10) is for correcting flatness and various aberrations well to secure a working distance required for observing a deep portion of a sample. If the lower limit value of the conditional Expression (10) is not reached, the rays deviating from the optical axis due to a long working distance are eclipsed by the cemented surface of the plano convex embedded lens. If the upper limit value of the conditional Expression (10) is exceeded, on the other hand, it is difficult to secure flatness, since curvature of the cemented surface (concave surface) of the plano convex embedded lens is gentle.

EXAMPLES

Each example according to the present embodiment will now be described with reference to the drawings.

In each example, the microscope objective lens is designed as an immersion type, and the immersion liquid (water) having refractive index nd=1.33255 and Abbe number νd=55.89, and a cover glass C having refractive index nd=1.52439, Abbe number νd=54.3 and thickness t=0.17 are used.

Table 1 to Table 6 shown below are tables of the parameters in Example 1 to Example 6. In [All Parameters], f denotes a composite focal length of the entire objective lens, NA denotes a numerical aperture, β denotes magnification, d0 denotes a distance from the surface facing the objective lens of a cover glass to a first lens surface (surface number 1 in Tables) of the first lens group G1, and TL denotes total length of the objective lens. In [Lens Data], a surface number denotes a sequence of the lens surfaces from the object, along the light traveling direction, r denotes a radius of curvature of each lens surface ("∞" and "0.00000" of radius of curvature r indicates a plane), d denotes a surface distance, that is a distance from each optical surface to the next optical surface (or image surface) on the optical axis, nd denotes a refractive index at the d-line (wavelength: 587.5620 nm), and vd is an Abbe number at the d-line. The [Focal Length Data of Each Group] shows a first surface and focal length of each group. In [Conditional Expression], values corresponding to conditional Expressions (1) to (10) are shown.

In the Tables, "mm" is normally used for the units of focal length f, radius of curvature r, surface distance d and other lengths. However, unit is not limited to "mm", but another appropriate unit can be used, since an equivalent optical performance is obtained even if an optical system is proportionally expanded or proportionally reduced.

Example 1

A microscope objective lens according to Example 1 will be described with reference to FIG. 1, FIG. 2 and Table 1. As FIG. 1 shows, the microscope objective lens according to Example 1 has, in order from an object (observation sample), a first lens group G1 having positive refractive power, a second lens group G2 having positive refractive power, and a third lens group G3 having negative refractive power.

The first lens group G1 has, in order from the object, a cemented lens L1 of a plano convex lens having a plane facing the object and a meniscus lens having a concave surface facing the object, and a single meniscus lens L2 having a concave surface facing the object. The second lens group G2 has, in order from the object, a cemented lens L3 of a negative meniscus lens having a convex surface facing the object and a biconvex lens, a cemented lens L4 of a negative meniscus lens having a convex surface facing the object and a biconvex lens, a cemented lens L5 of a biconvex lens, a biconcave lens and a biconvex lens, and a cemented lens L6 of a negative meniscus lens having a convex surface facing the object, a biconvex lens and a biconcave lens. The third lens group G3 has, in order from the object, a cemented meniscus lens L7, having a concave surface facing to the image side, of a positive meniscus lens having a convex surface facing the object and a negative meniscus lens having a convex surface facing the object, and a cemented meniscus lens L8 of a biconcave lens and a biconvex lens, having a concave surface facing the object.

In the second lens group G2, fluorite is used for the glass material of the positive lens component of the cemented lens L6, and anomalous dispersion glass of fluoride (or phosphate compound) of which Abbe number is 80 or higher is used for the glass material of the positive lens components of the cemented lenses L3 to L5.

Table 1 shows each parameter of Example 1. The surface numbers 1 to 25 in Table 1 correspond to the surfaces 1 to 25 shown in FIG. 1.

TABLE 1

[All Parameters]
f = 5.0, NA = 1.1, β = −40, d0 = 0.80, TL = 64.32

[Lens Parameters]

| Surface number | r | d | nd | vd | |
|---|---|---|---|---|---|
| 1 | ∞ | 0.8 | 1.45850 | 67.85 | |
| 2 | −1.8603 | 4.1 | 1.81600 | 46.62 | |
| 3 | −4.5075 | 0.1 | 1.00000 | | |
| 4 | −13.2217 | 3.1 | 1.49782 | 82.52 | |
| 5 | −7.9243 | 0.15 | 1.00000 | | |
| 6 | 130.1706 | 1.0 | 1.51742 | 52.43 | |
| 7 | 13.4779 | 7.7 | 1.49782 | 82.52 | |
| 8 | −15.2912 | 0.15 | 1.00000 | | |
| 9 | 31.7086 | 1.0 | 1.72916 | 54.68 | |
| 10 | 13.7427 | 7.8 | 1.43425 | 95.02 | |
| 11 | −20.8331 | 0.15 | 1.00000 | | |
| 12 | 33.0211 | 3.0 | 1.49782 | 82.52 | |
| 13 | −60.1991 | 1.0 | 1.81600 | 46.62 | |
| 14 | 13.6514 | 5.3 | 1.43425 | 95.02 | |
| 15 | −22.1706 | 0.6 | 1.00000 | | |
| 16 | 18.5970 | 1.2 | 1.72916 | 54.68 | |
| 17 | 12.1848 | 4.9 | 1.43385 | 95.25 | |
| 18 | −30.0130 | 1.0 | 1.65160 | 58.54 | |
| 19 | 33.6538 | 0.2 | 1.00000 | | |
| 20 | 8.2812 | 4.8 | 1.49782 | 82.52 | |
| 21 | 136.4169 | 3.7 | 1.72916 | 54.68 | |
| 22 | 5.8298 | 3.7 | 1.00000 | | |
| 23 | −6.7892 | 4.2 | 1.60300 | 65.44 | (Ln) |
| 24 | 62.4100 | 3.7 | 1.65412 | 39.68 | (Lp) |
| 25 | −10.5764 | 120 | 1.00000 | | |

[Focal Length Data of Each Group]

| Group number | First surface of group | Focal length of group |
|---|---|---|
| G1 | 1 | 9.85 |
| G2 | 6 | 17.80 |
| G3 | 20 | −63.97 |

[Conditional Expression]

Conditional Expression (1) d0/f = 0.16
Conditional Expression (2) θCt(p) − θCt(n) = 0.078(L5)
Conditional Expression (3) θhg(p) − θhg(n) = −0.028(L5)
Conditional Expression (4) |r2/f| = 0.372
Conditional Expression (5) |r3/d2| = 1.099
Conditional Expression (6) v3n = 52.43
Conditional Expression (7) {θCtA'(Ln) − θCtA'(Lp)}/{vd(Ln) − vd(Lp)} = 0.00292
Conditional Expression (8) {θFgh(Ln) − θFgh(Lp)}/{vd(Ln) − vd(Lp)} = 0.00039
Conditional Expression (9) vd(Lp) = 39.68
Conditional Expression (10) |r2|/(d0 + d1) = 1.16

As Table 1 on parameters shows, the microscope objective lens according to this example satisfies all the conditional Expressions (1) to (10).

FIG. 2 are graphs showing various aberrations of the microscope object lens according to Example 1 with respect to the h-line (wavelength: 404.7 nm) to the t-line (wavelength: 1014.0 nm), where A shows spherical aberration, B shows astigmatism and C shows distortion. In the graph showing astigmatism in B, the line "s" indicates a sagittal image surface, and line "t" indicates a meridional image surface respectively. In the graph showing distortion in C, aberration at the d-line, as a reference wavelength, is shown. In FIG. 2, "NA" denotes numerical aperture, and "y" denotes an image height (mm). This description on graphs showing aberrations is the same for Example 2.

As the graphs showing various aberrations in FIG. 2 clarify, according to the microscope objective lens in Example 1, various aberrations are well corrected throughout a wide wavelength area, and excellent image formation performance is ensured.

Example 2

A microscope objective lens according to Example 2 will be described with reference to FIG. 3, FIG. 4 and Table 2. As FIG. 3 shows, the microscope objective lens according to Example 2 has, in order from an object (observation sample), a first lens group G1 having positive refractive power, a second lens group G2 having positive refractive power, and a third lens group G3 having negative refractive power.

The first lens group G1 has, in order from the object, a cemented lens L1 of a plano convex lens having a plane facing the object and a meniscus lens having a concave surface facing the object, and a single meniscus lens L2 having a concave surface facing the object. The second lens group G2 has, in order from the object, a cemented lens L3 of a negative meniscus lens having a convex surface facing the object and a biconvex lens, a cemented lens L4 of a negative meniscus lens having a convex surface facing the object and a biconvex lens, a cemented lens L5 of a negative meniscus lens having a convex surface facing the object and a biconvex lens, and a cemented lens L6 of a negative meniscus lens having a convex surface facing the object, a biconvex lens and a biconcave lens. The third lens group G3 has, in order from the object, a cemented meniscus lens L7 of a biconvex lens and a biconcave lens, having a concave surface facing the object, and a cemented meniscus lens L8 of a biconcave lens and a biconvex lens, having a concave surface facing the object.

In the second lens group G2, fluorite is used for the glass material of the positive lens component of the cemented lens L5, and anomalous dispersion glass of fluoride (or phosphate compound) of which Abbe number is 80 or higher is used for the glass material of the positive lens components of the cemented lenses L3, L4 and L6.

Table 2 shows each parameter of Example 2. The surface numbers 1 to 24 in Table 2 correspond to the surfaces 1 to 24 in FIG. 3.

TABLE 2

[All Parameters]
f = 5.0, NA = 1.15, β = −40, d0 = 0.63, TL = 64.05

[Lens Parameters]

| Surface number | r | d | nd | vd | |
|---|---|---|---|---|---|
| 1 | ∞ | 0.85 | 1.45850 | 67.85 | |
| 2 | −1.8010 | 4.2 | 1.83481 | 42.71 | |
| 3 | −4.5203 | 0.15 | 1.00000 | | |
| 4 | −14.2897 | 3.1 | 1.49782 | 82.52 | |
| 5 | −7.9348 | 0.15 | 1.00000 | | |
| 6 | 197.1050 | 1.0 | 1.51742 | 52.43 | |
| 7 | 13.6111 | 8.4 | 1.49782 | 82.52 | |
| 8 | −16.8775 | 0.2 | 1.00000 | | |
| 9 | 38.1788 | 1.0 | 1.74320 | 49.34 | |
| 10 | 16.8679 | 7.6 | 1.43425 | 95.02 | |
| 11 | −20.3240 | 0.15 | 1.00000 | | |
| 12 | 117.3791 | 1.0 | 1.81600 | 46.62 | |
| 13 | 14.2255 | 7.7 | 1.43385 | 95.25 | |
| 14 | −19.3790 | 0.6 | 1.00000 | | |
| 15 | 15.2914 | 1.2 | 1.56384 | 60.69 | |
| 16 | 12.1050 | 5.3 | 1.43425 | 95.02 | |
| 17 | −36.1556 | 1.0 | 1.81600 | 46.62 | |
| 18 | 27.7207 | 0.15 | 1.00000 | | |
| 19 | 8.8639 | 5.0 | 1.49782 | 82.52 | |
| 20 | −100.8951 | 4.9 | 1.69680 | 55.52 | |
| 21 | 5.7001 | 3.7 | 1.00000 | | |
| 22 | −6.0286 | 2.4 | 1.65160 | 58.54 | (Ln) |
| 23 | 36.3621 | 3.5 | 1.80440 | 39.59 | (Lp) |
| 24 | −10.1886 | 120 | 1.00000 | | |

[Focal Length Data of Each Group]

| Group number | First surface of group | Focal length of group |
|---|---|---|
| G1 | 1 | 9.67 |
| G2 | 6 | 19.21 |
| G3 | 20 | −64.14 |

[Conditional Expression]

Conditional Expression (1) d0/f = 0.126
Conditional Expression (2) θCt(p) − θCt(n) = 0.049(L4)
Conditional Expression (3) θhg(p) − θhg(n) = −0.024(L4)
Conditional Expression (4) |r2/f| = 0.360
Conditional Expression (5) |r3/d2| = 1.076
Conditional Expression (6) ν3n = 52.43
Conditional Expression (7) {θCtA'(Ln) − θCtA'(Lp)}/{vd(Ln) − vd(Lp)}d = 0.00519
Conditional Expression (8) {θFgh(Ln) − θFgh(Lp)}/{vd(Ln) − vd(Lp)} = 0.00045
Conditional Expression (9) vd(Lp) = 39.59
Conditional Expression (10) |r2|/(d0 + d1) = 1.2

As the parameter table in Table 2 shows, the microscope objective lens according to this example satisfies all the conditional Expressions (1) to (10).

FIG. 4 are graphs showing various aberrations of the microscope object lens according to Example 2 with respect to the h-line (wavelength: 404.7 nm) to the t-line (wavelength: 1014.0 nm), where A shows spherical aberration, B shows astigmatism and C shows distortion.

As the graphs showing various aberrations in FIG. 4 clarify, according to the microscope objective lens in Example 2, various aberrations are well corrected throughout a wide wavelength area, and excellent image formation performance is ensured.

Example 3

Figure 5:
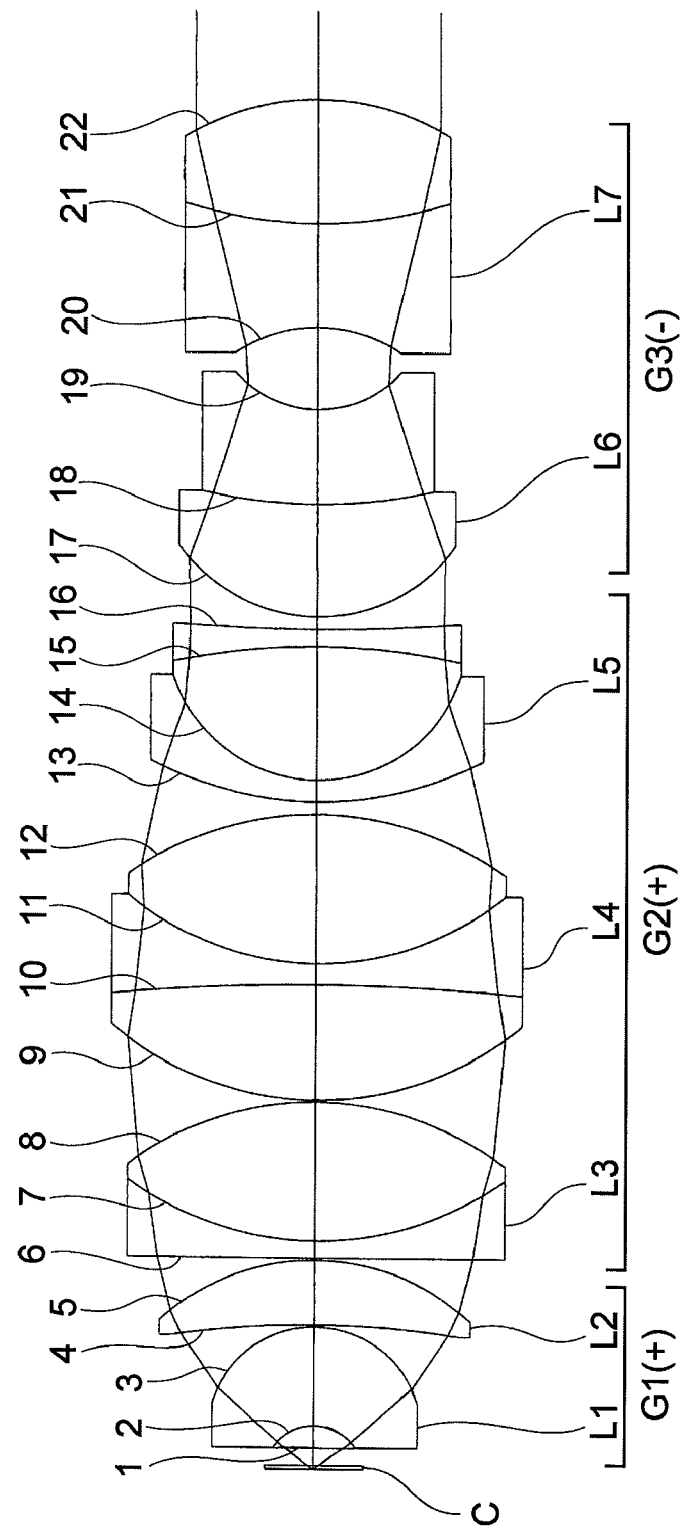
FIG. 5 is a diagram depicting a lens configuration of a microscope objective lens according to Example 3 of the present invention.

A microscope objective lens according to Example 3 will be described with reference to FIG. 5, FIG. 6 and Table 3. As FIG. 5 shows, the microscope objective lens according to Example 3 has, in order from an object (observation sample), a first lens group G1 having positive refractive power, a second lens group G2 having positive refractive power, and a third lens group G3 having negative refractive power.

The first lens group G1 has, in order from the object, a cemented lens L1 of a plano convex lens having a plane facing the object and a meniscus lens having a concave surface facing the object, and a single meniscus lens L2 having a concave surface facing the object. The second lens group G2 has, in order from the object, a cemented lens L3 of a biconcave lens and a biconvex lens, a cemented lens L4 of a biconvex lens, a biconcave lens, and a biconvex lens, and a cemented lens L5 of a negative meniscus lens having a convex surface facing the object, a biconvex lens and a biconcave lens. The third lens group G3 has, in order from the object, a cemented meniscus lens L6, having a concave surface facing to the image side, of a positive meniscus lens having a convex face facing the object and a negative meniscus lens having a convex surface facing the object, and a cemented meniscus lens L7 of a biconcave lens and a biconvex lens, having a concave surface facing the object.

In the second lens group G2, fluorite is used for the glass material of the positive lens component of the cemented lenses L4 and L5, and anomalous dispersion glass of fluoride (or phosphate compound) of which Abbe number is 80 or higher is used for the glass material of the positive lens components of the cemented lens L3.

Table 3 shows each parameter of Example 3. The surface numbers 1 to 22 in Table 3 correspond to the surfaces 1 to 22 shown in FIG. 5.

TABLE 3

[All Parameters]
f = 5.0, NA = 1.10, β = −40, d0 = 0.80, TL = 63.13

[Lens Parameters]

| Surface number | r | d | nd | vd | |
|---|---|---|---|---|---|
| 1 | 0.00000 | 1.00000 | 1.4585040 | 67.84 | |
| 2 | −2.22844 | 4.50000 | 1.8348100 | 42.71 | |
| 3 | −4.82991 | 0.10000 | 1.0000000 | | |
| 4 | −41.7768 | 2.95022 | 1.6030010 | 65.44 | |
| 5 | −10.25523 | 0.10000 | 1.0000000 | | |
| 6 | −2069.54142 | 0.80010 | 1.7335000 | 51.48 | |
| 7 | 14.34543 | 6.37195 | 1.4978200 | 82.52 | |
| 8 | −13.76313 | 0.10000 | 1.0000000 | | |
| 9 | 14.26146 | 5.30051 | 1.4338520 | 95.25 | |
| 10 | −93.15791 | 1.00029 | 1.8160000 | 46.62 | |
| 11 | 13.06968 | 6.91976 | 1.4338520 | 95.25 | |
| 12 | −14.32769 | 0.60000 | 1.0000000 | | |
| 13 | 15.84663 | 0.99998 | 1.7340000 | 51.48 | |
| 14 | 6.77475 | 6.19995 | 1.4338520 | 95.25 | |
| 15 | −29.95761 | 0.80010 | 1.8160000 | 46.62 | |
| 16 | 80.82453 | 0.60000 | 1.0000000 | | |
| 17 | 7.59369 | 5.20242 | 1.4978200 | 82.52 | |
| 18 | 23.28817 | 4.36481 | 1.7879710 | 47.38 | |
| 19 | 4.91292 | 3.77414 | 1.0000000 | | |
| 20 | −6.67493 | 4.80118 | 1.6030010 | 65.44 | (Ln) |
| 21 | 19.70880 | 5.68041 | 1.6700300 | 47.24 | (Lp) |
| 22 | −11.38020 | | | | |

[Focal Length Data of Each Group]

| Group number | First surface of group | Focal length of group |
|---|---|---|
| G1 | 1 | 7.58 |
| G2 | 6 | 23.68 |
| G3 | 17 | −18.07 |

[Conditional Expression]

Conditional Expression (1) d0/f = 0.16
Conditional Expression (2) θCt(p) − θCt(n) = 0.0683(L5)
Conditional Expression (3) θhg(p) − θhg(n) = −0.029(L5)
Conditional Expression (4) |r2/f| = 0.4456
Conditional Expression (5) |r3/d2| = 1.073
Conditional Expression (6) ν3n = 51.48
Conditional Expression (7) {θCtA'(Ln) − θCtA'(Lp)}/{vd(Ln) − vd(Lp)} = 0.00399
Conditional Expression (8) {θFgh(Ln) − θFgh(Lp)}/{vd(Ln) − vd(Lp)} = 0.00043
Conditional Expression (9) vd(Lp) = 47.24
Conditional Expression (10) |r2|/(d0 + d1) = 1.2

As Table 3 on parameters shows, the microscope objective lens according to this example satisfies all the conditional Expressions (1) to (10).

FIG. 6 are graphs showing various aberrations of the microscope object lens according to Example 3 with respect to the h-line (wavelength: 404.7 nm) to the t-line (wavelength: 1014.0 nm), where A shows spherical aberration, B shows curvature of field and C shows distortion. In the graph showing spherical aberration in A, h shows an aberration at the h-line (wavelength: 404.7 nm), g at the g-line (wavelength: 435.8 nm), F at the F-line (wavelength: 486.1 nm), d at the d-line (wavelength: 587.6 nm), C at the C-line (wavelength: 656.3 nm), s at the s-line (wavelength: 852.1 nm) and t at the t-line (wavelength: 1014.0 nm) respectively. In the graph showing curvature of field in B, the line S indicates a sagittal image surface, and the line M indicates a meridional image surface respectively. In the graph showing distortion in C, aberration at the d-line, as a reference wavelength, is shown. This description on graphs showing aberrations is the same for Example 4 to Example 6.

As the graphs showing various aberrations in FIG. 6 clarify, according to the microscope objective lens in Example 3, various aberrations are well corrected throughout a wide wavelength area, and excellent image formation performance is ensured.

Example 4

A microscope objective lens according to Example 4 will be described with reference to FIG. 7, FIG. 8 and Table 4. As FIG. 7 shows, the microscope objective lens according to Example 4 has, in order from an object (observation sample), a first lens group G1 having positive refractive power, a second lens group G2 having positive refractive power, and a third lens group G3 having negative refractive power.

The first lens group G1 has, in order from the object, a cemented lens L1 of a plano convex lens having a plane facing the object and a meniscus lens having a concave surface facing the object, and, a single meniscus lens L2 having a concave surface facing the object. The second lens group G2 has, in order from the object, a cemented lens L3 of a biconcave lens and a biconvex lens, a cemented lens L4 of a biconvex lens, a biconcave lens and a biconvex lens, and a cemented lens L5 of a negative meniscus lens having a convex surface facing the object, a biconvex lens and a biconcave lens. The third lens group G3 has, in order from the object, a cemented meniscus lens L6 of a biconvex lens and a biconcave lens, having a concave surface facing the object, and a cemented meniscus lens L7 of a biconcave lens and a biconvex lens, having a concave surface facing the object.

In the second lens group G2, fluorite is used for the glass material of the positive lens component of the cemented lenses L3, L4 and L5 (where, surface numbers 11 and 12 correspond for lens L4) and anomalous dispersion glass of fluoride (or phosphate compound) of which Abbe number is 80 or higher is used for the glass material of the positive lens components of the cemented lens L4 (where, surface numbers 9 and 10 correspond).

Table 4 shows each parameter of Example 4. The surface numbers 1 to 22 in Table 4 correspond to the surfaces 1 to 22 shown in FIG. 7.

TABLE 4

[All Parameters]
f = 5.0, NA = 1.10, β = −40, d0 = 0.80, TL = 61.09

[Lens Parameters]

| Surface number | r | d | nd | vd |
|---|---|---|---|---|
| 1 | 0.00000 | 1.00000 | 1.4585040 | 67.84 |
| 2 | −2.89879 | 4.50000 | 1.8348100 | 42.71 |
| 3 | −4.97287 | 0.10000 | 1.0000000 | |
| 4 | −226.29510 | 2.93280 | 1.6400000 | 60.08 |
| 5 | −11.98507 | 0.10069 | 1.0000000 | |
| 6 | −46.75812 | 0.80887 | 1.8348100 | 42.71 |
| 7 | 18.08764 | 6.14763 | 1.4338520 | 95.25 |
| 8 | −10.48606 | 0.10000 | 1.0000000 | |
| 9 | 14.49814 | 6.38679 | 1.4978200 | 82.52 |
| 10 | −61.40744 | 1.32984 | 1.6968000 | 55.53 |

TABLE 4-continued

[All Parameters]
f = 5.0, NA = 1.10, β = −40, d0 = 0.80, TL = 61.09

| | | | | |
|---|---|---|---|---|
| 11 | 11.84300 | 7.21342 | 1.4338520 | 95.25 |
| 12 | −17.45342 | 0.10004 | 1.0000000 | |
| 13 | 14.35077 | 1.24092 | 1.8160000 | 46.62 |
| 14 | 7.04219 | 5.63124 | 1.4338520 | 95.25 |
| 15 | −52.38293 | 0.82118 | 1.8160000 | 46.62 |
| 16 | 108.89642 | 0.10009 | 1.0000000 | |
| 17 | 6.87276 | 4.48166 | 1.4978200 | 82.52 |
| 18 | −25.45622 | 4.02871 | 1.7291570 | 54.68 |
| 19 | 4.80935 | 3.70962 | 1.0000000 | |
| 20 | −6.01874 | 4.07026 | 1.6030010 | 65.44 (Ln) |
| 21 | 16.39243 | 5.31620 | 1.6237410 | 47.04 (Lp) |
| 22 | −9.66837 | | | |

[Focal Length Data of Each Group]

| Group number | First surface of group | Focal length of group |
|---|---|---|
| G1 | 1 | 6.70 |
| G2 | 6 | 20.82 |
| G3 | 17 | −14.24 |

[Conditional Expression]

Conditional Expression (1) d0/f = 0.16
Conditional Expression (2) θCt(p) − θCt(n) = 0.0683(L5)
Conditional Expression (3) θhg(p) − θhg(n) = −0.029(L5)
Conditional Expression (4) |r2/f| = 0.5798
Conditional Expression (5) |r3/d2| = 1.105
Conditional Expression (6) ν3n = 42.71
Conditional Expression (7) {θCtA'(Ln) − θCtA'(Lp)}/{νd(Ln) − νd(Lp)} = 0.00494
Conditional Expression (8) {θFgh(Ln) − θFgh(Lp)}/{νd(Ln) − νd(Lp)} = 0.00035
Conditional Expression (9) νd(Lp) = 47.04
Conditional Expression (10) |r2|/(d0 + d1) = 1.6

As the parameter table in Table 4 shows, the microscope objective lens according to this example satisfies all the conditional Expressions (1) to (3) and (5) to (10).

FIG. 8 are graphs showing various aberrations of the microscope object lens according to Example 4 with respect to the h-line (wavelength: 404.7 nm) to the t-line (wavelength: 1014.0 nm), where A shows spherical aberration, B shows curvature of filed and C shows distortion.

As the graphs showing various aberrations in FIG. 8 clarify, according to the microscope objective lens in Example 4, various aberrations are well corrected throughout a wide wavelength area, and excellent image formation performance is ensured.

Example 5

A microscope objective lens according to Example 5 will be described with reference to FIG. 9, FIG. 10 and Table 5. As FIG. 9 shows, the microscope objective lens according to Example 5 has, in order from an object (observation sample), a first lens group G1 having positive refractive power, a second lens group G2 having positive refractive power, and a third lens group G3 having negative refractive power.

The first lens group G1 has, in order from the object, a cemented lens L1 of a plano convex lens having a plane facing the object and a meniscus lens having a concave surface facing the object, and a single meniscus lens L2 having a concave surface facing the object. The second lens group G2 has, in order from the object, a cemented lens L3 of a negative meniscus lens having a convex surface facing the object and a biconvex lens, a cemented lens L4 of a biconvex lens, a biconcave lens and a biconvex lens, and a cemented lens L5 of a negative meniscus lens having a convex surface facing the object, a biconvex lens and a biconcave lens. The third lens group G3 has, in order from the object, a cemented meniscus lens L6, having a concave surface facing to the image side, of a positive meniscus lens having a convex surface facing the object and a negative meniscus lens having a convex surface facing the object, and a cemented meniscus lens L7 of a biconcave lens and a biconvex lens, having a concave surface facing the object.

In the second lens group G2, fluorite is used for the glass material of the positive lens component of the cemented lenses LA and L5, and anomalous dispersion glass of fluoride (or phosphate compound) of which Abbe number is 80 or higher is used for the glass material of the positive lens components of the cemented lens L3.

Table 5 shows each parameter of Example 5. The surface numbers 1 to 22 in Table 5 correspond to the surfaces 1 to 22 shown in FIG. 9.

TABLE 5

[All Parameters]
f = 5.0, NA = 1.10, β = −40, d0 = 0.80, TL = 63.14

[Lens Parameters]

| Surface number | r | d | nd | νd | |
|---|---|---|---|---|---|
| 1 | 0.00000 | 1.00000 | 1.4585040 | 67.84 | |
| 2 | −2.22352 | 4.50000 | 1.8348100 | 42.71 | |
| 3 | −4.74337 | 0.10000 | 1.0000000 | | |
| 4 | −36.75295 | 2.95022 | 1.6030010 | 65.44 | |
| 5 | −10.30280 | 0.09999 | 1.0000000 | | |
| 6 | 374.46960 | 0.80010 | 1.7335000 | 51.48 | |
| 7 | 13.84504 | 6.37195 | 1.4978200 | 82.52 | |
| 8 | −13.93067 | 0.10000 | 1.0000000 | | |
| 9 | 14.83087 | 5.30051 | 1.4338520 | 95.25 | |
| 10 | −48.55800 | 1.00029 | 1.8160000 | 46.62 | |
| 11 | 13.79936 | 6.91976 | 1.4338520 | 95.25 | |
| 12 | −13.39265 | 0.60000 | 1.0000000 | | |
| 13 | 14.31125 | 0.99998 | 1.7340000 | 51.48 | |
| 14 | 6.58877 | 6.19995 | 1.4338520 | 95.25 | |
| 15 | −28.32785 | 0.80010 | 1.8160000 | 46.62 | |
| 16 | 46.95408 | 0.60000 | 1.0000000 | | |
| 17 | 7.54958 | 5.20242 | 1.4978200 | 82.52 | |
| 18 | 13.99709 | 4.36481 | 1.7879710 | 47.38 | |
| 19 | 4.71243 | 3.77414 | 1.0000000 | | |
| 20 | −6.45670 | 4.80118 | 1.6180000 | 63.33 | (Ln) |
| 21 | 21.55605 | 5.68041 | 1.6700300 | 47.24 | (Lp) |
| 22 | −10.90315 | | | | |

[Focal Length Data of Each Group]

| Group number | First surface of group | Focal length of group |
|---|---|---|
| G1 | 1 | 7.52 |
| G2 | 6 | 24.81 |
| G3 | 17 | −19.38 |

[Conditional Expression]

Conditional Expression (1) d0/f = 0.16
Conditional Expression (2) θCt(p) − θCt(n) = 0.0683(L5)
Conditional Expression (3) θhg(p) − θhg(n) = −0.029(L5)
Conditional Expression (4) |r2/f| = 0.4447
Conditional Expression (5) |r3/d2| = 1.105
Conditional Expression (6) ν3n = 51.48
Conditional Expression (7) {θCtA'(Ln) − θCtA'(Lp)}/{νd(Ln) − νd(Lp)} = 0.00292
Conditional Expression (8) {θFgh(Ln) − θFgh(Lp)}/{νd(Ln) − νd(Lp)} = 0.00044
Conditional Expression (9) νd(Lp) = 47.24
Conditional Expression (10) |r2|/(d0 + d1) = 1.2

As the parameter table in Table 5 shows, the microscope objective lens according to this example satisfies all the conditional Expressions (1) to (10).

FIG. 10 are graphs showing various aberrations of the microscope object lens according to Example 5 with respect to the h-line (wavelength: 404.7 nm) to the t-line (wavelength: 1014.0 nm), where A shows spherical aberration, B shows curvature of field and C shows distortion.

As the graphs showing various aberrations in FIG. 10 clarify, according to the microscope objective lens in Example 5, various aberrations are well corrected throughout a wide wavelength area, and excellent image formation performance is ensured.

Example 6

Figure 11:
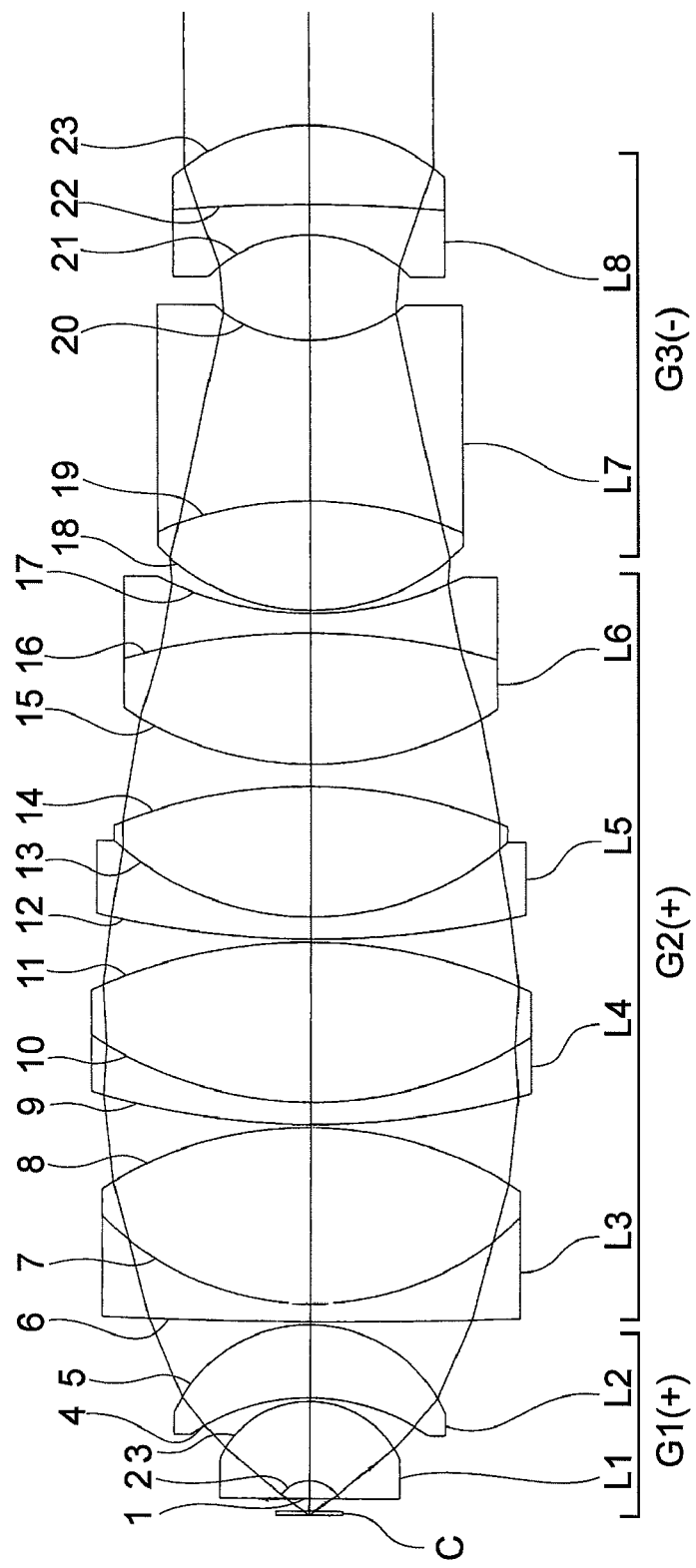
FIG. 11 is a diagram depicting a lens configuration of a microscope objective lens according to Example 6 of the present invention.

A microscope objective lens according to Example 6 will be described with reference to FIG. 11, FIG. 12 and Table 6. As FIG. 11 shows, the microscope objective lens according to Example 6 has, in order from an object (observation sample), a first lens group G1 having positive refractive power, a second lens group G2 having positive refractive power, and a third lens group G3 having negative refractive power.

The first lens group G1 has, in order from the object, a cemented lens L1 of a plano convex lens having a plane facing the object and a meniscus lens having a concave surface facing the object, and a single meniscus lens L2 having a concave surface facing the object. The second lens group G2 has, in order from the object, a cemented lens L3 of a negative meniscus lens having a convex surface facing the object and a biconvex lens, a cemented lens L4 of a negative meniscus lens having a convex surface facing the object and a biconvex lens, a cemented lens L5 of a negative meniscus lens having a convex surface facing the object and a biconvex lens, and a cemented lens L6 of a biconvex lens and a biconcave lens. The third lens group G3 has, in order from the object, a cemented meniscus lens L7 of a biconvex lens and a biconcave lens, having a concave surface facing the object, and a cemented meniscus lens L8, having a concave surface facing the object, of a negative meniscus lens having a concave surface facing the object and a positive meniscus lens having a concave surface facing the object.

In the second lens group G2, fluorite is used for the glass material of the positive lens component of the cemented lenses L5 and L6, and anomalous dispersion glass of fluoride (or phosphate compound) of which Abbe number is 80 or higher is used for the glass material of the positive lens components of the cemented lenses L3 and L4.

Table 6 shows each parameter of Example 6. The surface numbers 1 to 23 in Table 6 correspond to the surfaces 1 to 23 shown in FIG. 11.

TABLE 6

[All Parameters]
f = 5.0, NA = 1.10, β = −40, d0 = 0.60, TL = 63.34

[Lens Parameters]

| Surface number | r | d | nd | vd | |
|---|---|---|---|---|---|
| 1 | 0.00000 | 0.80000 | 1.4585040 | 67.84 | |
| 2 | −1.55000 | 3.60000 | 1.8348100 | 42.71 | |
| 3 | −4.37124 | 0.16853 | 1.0000000 | | |
| 4 | −9.03009 | 3.29910 | 1.5924000 | 68.30 | |
| 5 | −6.49147 | 0.14436 | 1.0000000 | | |
| 6 | 225.81901 | 0.79925 | 1.5174170 | 52.43 | |
| 7 | 12.75164 | 7.99889 | 1.4978200 | 82.52 | |
| 8 | −16.53076 | 0.14729 | 1.0000000 | | |
| 9 | 33.27978 | 0.99973 | 1.7549990 | 52.32 | |
| 10 | 17.34810 | 7.29940 | 1.4342500 | 95.00 | |
| 11 | −22.00861 | 0.14930 | 1.0000000 | | |
| 12 | 40.50031 | 0.99996 | 1.8160000 | 46.62 | |
| 13 | 12.58920 | 5.99963 | 1.4338520 | 95.25 | |
| 14 | −21.70892 | 1.00238 | 1.0000000 | | |
| 15 | 14.56569 | 6.00511 | 1.4338520 | 95.25 | |
| 16 | −29.13064 | 0.90010 | 1.8160000 | 46.62 | |
| 17 | 14.31749 | 0.14777 | 1.0000000 | | |
| 18 | 9.25434 | 5.00015 | 1.4978200 | 82.52 | |
| 19 | −16.56623 | 7.30023 | 1.5638400 | 60.67 | |
| 20 | 6.41029 | 4.79725 | 1.0000000 | | |
| 21 | −6.20020 | 1.40000 | 1.6180000 | 63.33 | (Ln) |
| 22 | −71.05278 | 3.60000 | 1.7620010 | 40.10 | (Lp) |
| 23 | −8.85307 | | | | |

[Focal Length Data of Each Group]

| Group number | First surface of group | Focal length of group |
|---|---|---|
| G1 | 1 | 11.40 |
| G2 | 6 | 17.87 |
| G3 | 18 | −27.80 |

[Conditional Expression]

Conditional Expression (1) d0/f = 0.12
Conditional Expression (2) θCt(p) − θCt(n) = 0.0683(L5)
Conditional Expression (3) θhg(p) − θhg(n) = −0.029(L5)
Conditional Expression (4) |r2/f| = 0.3100
Conditional Expression (5) |r3/d2| = 1.214
Conditional Expression (6) ν3n = 52.43
Conditional Expression (7) {θCtA'(Ln) − θCtA'(Lp)}/{vd(Ln) − vd(Lp)} = 0.00359
Conditional Expression (8) {θFgh(Ln) − θFgh(Lp)}/{vd(Ln) − vd(Lp)} = 0.00043
Conditional Expression (9) vd(Lp) = 40.10
Conditional Expression (10) |r2|/(d0 + d1) = 1.1

As the parameter table in Table 6 shows, the microscope objective lens according to this example satisfies all the conditional Expressions (1) to (4) and (6) to (10).

Figure 12:
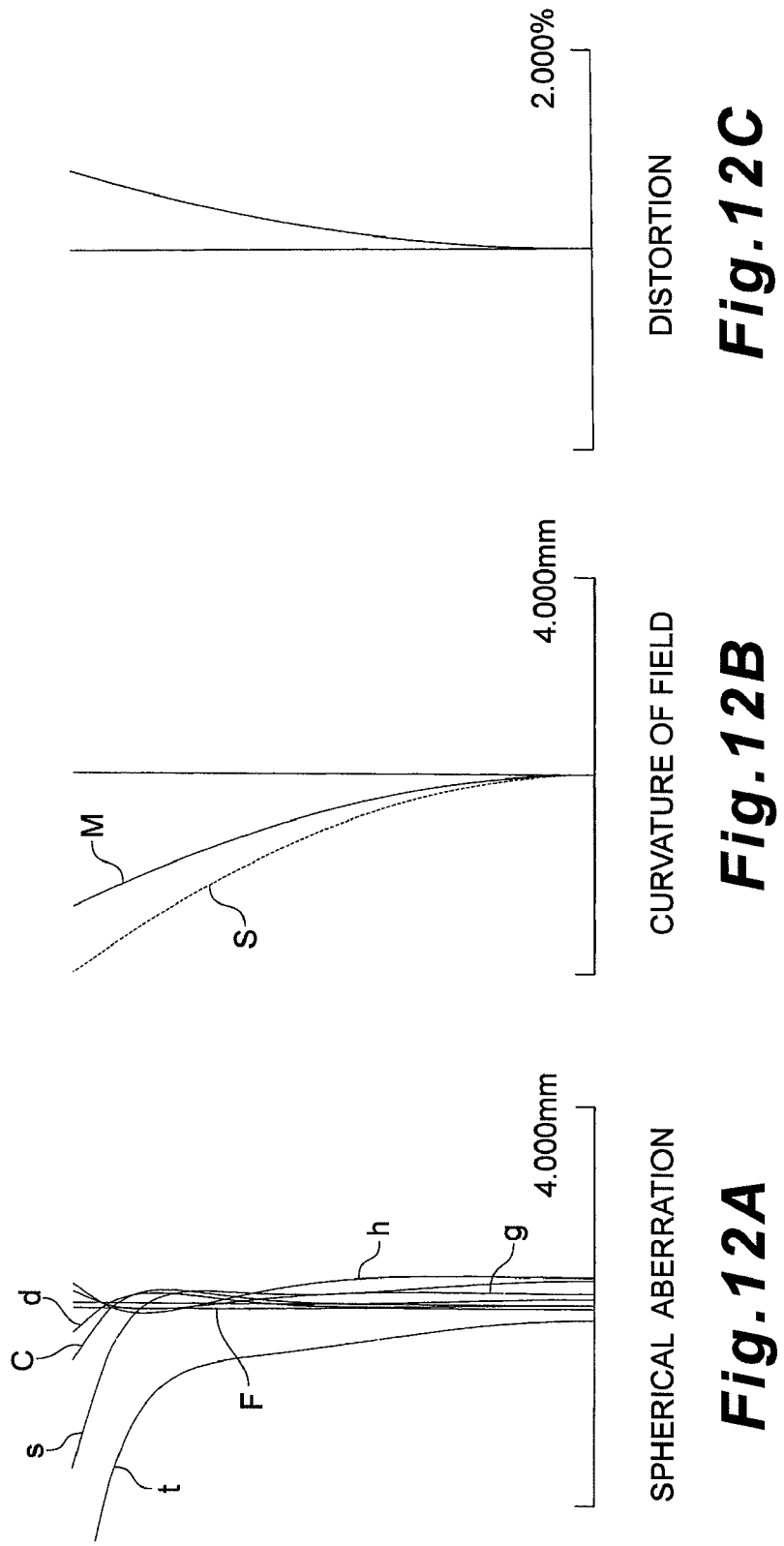
FIG. 12 are graphs showing various aberrations of the microscope objective lens according to Example 6 of the present invention, where

FIG. 12 are graphs showing various aberrations of the microscope object lens according to Example 6 with respect to the h-line (wavelength: 404.7 nm) to the t-line (wavelength: 1014.0 nm), where A shows spherical aberration, B shows curvature of field and C shows distortion.

As the graphs showing various aberrations in FIG. 12 clarify, according to the microscope objective lens in Example 6, various aberrations are well corrected throughout a wide wavelength area, and excellent image formation performance is ensured.

All the microscope objective lenses used for each example are infinity optical system correction type lenses, so an imaging lens is disposed at the image side of the microscope objective lens, and a finite optical system is created by the combination of the microscope objective lens and imaging lens. Here the imaging lens used for the above examples will be described with reference to FIG. 13 and Table 7.

Figure 13:
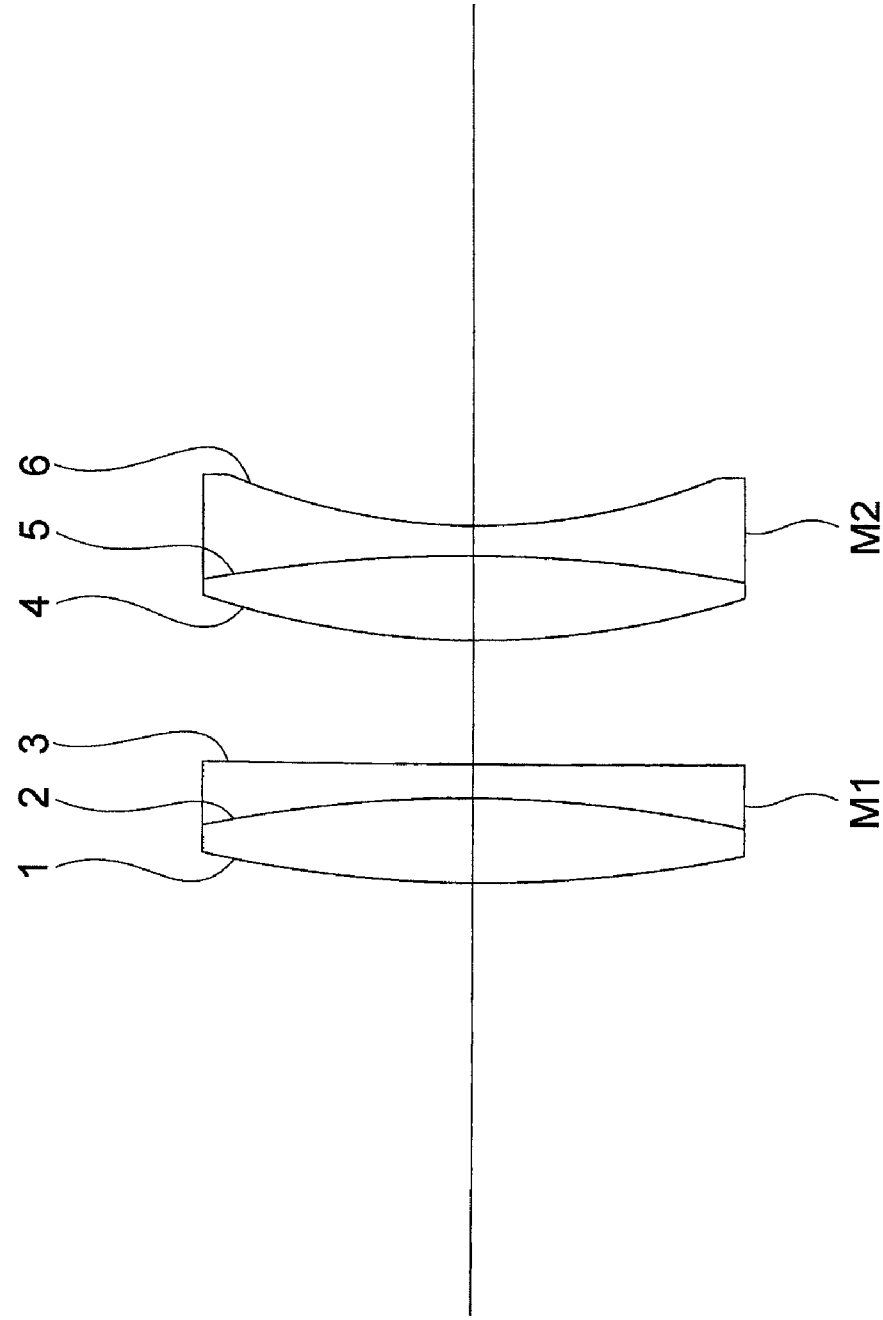
FIG. 13 is a diagram depicting a lens configuration of an imaging lens used in combination with a microscope objective lens according to Example 1 of the present invention.

FIG. 13 is a diagram depicting a configuration of the imaging lens that is used combined with the microscope objective lens according to each example. As FIG. 13 shows, the imaging lens has, in order from the object, a first cemented lens M1 of a biconvex lens and a biconcave lens, and a second cemented lens M2 of a biconvex lens and a biconcave lens. Table 7 shows parameter values of this imaging lens. In Table 7, f' denotes a focal length of the imaging lens system, the surface number indicates a sequence of a lens surface counted from the object side along the light traveling direction (hereafter called "surface number"), d denotes a surface distance, that is, a distance from each optical surface to the next optical surface (or image surface), nd denotes a refractive index at the d-line (wavelength: 587.6 nm) of a glass constituting each lens, and νd denotes an Abbe number at the d-line (wavelength: 587.6 nm) of a glass constituting each lens.

TABLE 7

[Lens Parameters]
f = 200

| Surface Number | Radius of curvature | Surface distance | Refractive index | Abbe number |
|---|---|---|---|---|
| 1 | 75.043 | 5.1 | 1.62801 | 57.03 |
| 2 | −75.043 | 2.0 | 1.74950 | 35.19 |
| 3 | 1600.580 | 7.5 | | |
| 4 | 50.260 | 5.1 | 1.66755 | 41.96 |
| 5 | −84.541 | 1.8 | 1.61266 | 44.41 |
| 6 | 36.911 | | | |

To assist in understanding the present invention, embodiments were described using configuration requirements, however needless to say, these to not limit the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An immersion microscope objective lens comprising: in order from an object,
a first lens group with positive refractive power, having a cemented lens of a plano convex lens having a plane facing the object and a meniscus lens having a concave surface facing the object, and a single meniscus lens having a concave surface facing the object;
a second lens group with positive refractive power, having plurality of cemented lenses; and
a third lens group with negative refractive power, having a cemented meniscus lens having a concave surface facing an image, and a cemented meniscus lens having a concave surface facing the object,
the following conditional expression being satisfied:

$0.12 < d0/f < 0.25$ where d0 denotes a distance from the object surface to the first lens surface, and f denotes the focal length of the objective lens, and
a positive lens and a negative lens which constitute at least one set of cemented lens in the second lens groups satisfying the following conditional expressions:

$0.04 < \theta Ct(p) - \theta Ct(n) < 0.09$ $-0.03 < \theta hg(p) - \theta hg(n) < 0.00$ where θCt(p) denotes a partial dispersion ratio of the F-line, C-line and t-line and θhg(p) denotes a partial dispersion ratio of the h-line, g-line, F-line and C-line of the positive lens, and θct(n) denotes a partial dispersion ratio of the F-line, C-line and t-line, and θhg(n) denotes a partial dispersion ratio of the h-line, g-line, F-line and C-line of the negative lens,
where the partial dispersion ratio θCt and θhg are defined by $\theta Ct = (nC-nt)/(nF-nC)$ and $\theta hg = (nh-ng)/(nF-nC)$, when nC denotes a refractive index of the glass material at the C-line, nt denotes a refractive index thereof at the t-line, nF denotes a refractive index thereof at the F-line, nh denotes a refractive index thereof at the h-line, and ng denotes a refractive index thereof at the g-line.

2. The immersion microscope objective lens according to claim 1, wherein the cemented lens of the plano convex lens which constitutes the first lens group and the meniscus lens having the concave surface facing the object satisfies the following conditional expressions:

$0.3 < |r2/f| < 0.7$ $1.0 < |r3/d2| < 1.3$ where r2 denotes a radius of curvature of the cemented surface of the cemented lens, f denotes a focal length of the objective lens, r3 denotes a radius of curvature of the image side lens surface of the meniscus lens having the concave surface facing the object, and d2 denotes a thickness of the meniscus lens having a concave surface facing the object.

3. The immersion microscope objective lens according to claim 1, wherein
the negative lens which constitutes the cemented lens disposed closest to the object, out of the second lens group, satisfies the following conditional expression:

$40 < v3n < 60$ where v3n denotes an Abbe number.

4. The immersion microscope objective lens according to claim 1, wherein
the second lens group includes at least a cemented lens that uses fluorite as glass material of the positive lens component, and a cemented lens that uses anomalous dispersion glass with an 80 or higher Abbe number as glass material of the positive lens component.

5. The immersion microscope objective lens according to claim 4, wherein
the anomalous dispersion glass with an 80 or higher Abbe number is a fluoride or phospate compound anomalous dispersion glass.

6. An immersion microscope objective lens comprising: in order from an object, a plano convex embedded lens having a strong concave cemented surface facing the object; and two cemented meniscus lenses of which respective concave surfaces face each other,
the cemented meniscus lens having the concave surface facing the object in the two cemented meniscus lenses, comprising, in order from the object, a negative lens and a positive lens, and satisfying the following conditional expressions:

$0.0029 < \{\theta CtA'(Ln) - \theta CtA'(Lp)\}/\{vd(Ln) - vd(Lp)\} \leq 0.0052$ $0.00034 < \{\theta Fgh(Ln) - \theta Fgh(Lp)\}/\{vd(Ln) - vd(Lp)\} \leq 0.00046$ $38 < vd(Lp) < 50$ where θCtA'(Ln) and θCtA'(Lp) denote partial dispersion ratios of the C-line, t-line and A' line of the negative lens and the positive lens respectively, θFgh(Ln) and θFgh(Lp) denotes partial dispersion ratios of the F-line, g-line and h-line of the negative lens and positive lens respectively, and vd(Ln) and vd(Lp) denote Abbe numbers at the d-line of the negative lens and the positive lens respectively,
where the partial dispersion ratios θCtA' and θFgh are defined as $\theta CtA' = (nC-nt)/(nC-nA')$ and $\theta Fgh = (nF-ng)/(nF-nh)$ respectively, when nC denotes a refractive index of the glass material at the C-line, nt denotes a refractive index thereof at the t-line, nA' denotes a refractive index thereof at the A'-line, nF denotes a refractive index thereof at the F-line, ng denotes a refractive index thereof at the g-line, and nh denotes a refractive index thereof at the h-line.

7. The immersion microscope objective lens according to claim 6, wherein
the plano convex embedded lens is a cemented lens of a plano convex lens having a plane facing the object and a meniscus lens having a concave surface facing the object, which are disposed in order from the object and cemented at the cemented surface, and satisfies the following conditional expression:

$1.0 < |r2|/(d0+d1) < 1.7$ where r2 denotes a curvature of the cemented surface of the piano convex embedded lens, d0 denotes a length from the object surface to the lens surface of the piano convex lens facing the object, and d1 denotes a center thickness of the piano convex lens.

8. The immersion microscope objective lens according to claim 2, wherein
the negative lens which constitutes the cemented lens disposed closest to the object, out of the second lens group, satisfies the following conditional expression:

$40 < v3n < 60$ where v3n denotes an Abbe number.

9. The immersion microscope objective lens according to claim 8, wherein
the second lens group includes at least a cemented lens that uses fluorite as glass material of the positive lens component, and a cemented lens that uses anomalous dispersion glass with an 80 or higher Abbe number as glass material of the positive lens component.

10. The immersion microscope objective lens according to claim 9, wherein
the anomalous dispersion glass with an 80 or higher Abbe number is a fluoride or phospate compound anomalous dispersion glass.

11. The immersion microscope objective lens according to claim 2, wherein
the second lens group includes at least a cemented lens that uses fluorite as glass material of the positive lens component, and a cemented lens that uses anomalous dispersion glass with an 80 or higher Abbe number as glass material of the positive lens component.

12. The immersion microscope objective lens according to claim 11, wherein
the anomalous dispersion glass with an 80 or higher Abbe number is a fluoride or phospate compound anomalous dispersion glass.

* * * * *